United States Patent
Komada

(10) Patent No.: US 8,705,078 B2
(45) Date of Patent: Apr. 22, 2014

(54) IMAGE OUTPUT SYSTEM AND METHOD FOR LOGGING IMAGE DATA STORAGE LOCATION

(75) Inventor: Yasuo Komada, Inagi (JP)

(73) Assignee: Canon Kabushiki Kaisha (JP)

( * ) Notice: Subject to any disclaimer, the term of this patent is extended or adjusted under 35 U.S.C. 154(b) by 1285 days.

(21) Appl. No.: 11/759,613

(22) Filed: Jun. 7, 2007

(65) Prior Publication Data

US 2007/0285712 A1 Dec. 13, 2007

(30) Foreign Application Priority Data

Jun. 12, 2006 (JP) .................................. 2006-162809

(51) Int. Cl.
*G06F 3/12* (2006.01)

(52) U.S. Cl.
USPC .......... 358/1.15; 358/1.13; 358/1.16; 399/10; 709/217; 709/218

(58) Field of Classification Search
USPC .............. 358/1.15, 1.1, 1.13, 1.14, 1.16, 296, 358/403, 448; 386/241; 399/10; 706/45; 707/769; 709/203, 217, 218, 224, 225, 709/229; 715/255
See application file for complete search history.

(56) References Cited

U.S. PATENT DOCUMENTS

| | | | |
|---|---|---|---|
| 5,602,933 A | 2/1997 | Blackwell et al. | |
| 5,960,460 A | 9/1999 | Marasco et al. | |
| 5,978,477 A * | 11/1999 | Hull et al. | ...... 358/403 |
| 7,516,102 B2 | 4/2009 | Takamine | |
| 7,576,883 B2 | 8/2009 | Ragnet et al. | |
| 7,586,635 B2 | 9/2009 | Maeda et al. | |
| 7,623,253 B1 * | 11/2009 | Oyama et al. | ......... 358/1.14 |
| 7,698,471 B2 | 4/2010 | Aoki et al. | |
| 2002/0023084 A1 * | 2/2002 | Eyal et al. | ...................... 707/3 |

(Continued)

FOREIGN PATENT DOCUMENTS

| | | |
|---|---|---|
| JP | 6-268791 A | 9/1994 |
| JP | 2002016788 A | 1/2002 |
| JP | 2002-358244 A | 12/2002 |
| JP | 2003-023517 A | 1/2003 |

(Continued)

OTHER PUBLICATIONS

Shelton et al., "Thumbnail or encoding history of jobs copied/printed/sent for audits", Research Disclosure Database No. 473025, Sep. 2003.*

(Continued)

*Primary Examiner* — David S Cammack
(74) *Attorney, Agent, or Firm* — Rossi, Kimms & McDowell LLP

(57) ABSTRACT

This invention prevents the operation performance drop of an image input and output apparatus even when the frequency of use of the image input and output apparatus is high upon recording log information in a system that comprises the image input and output apparatus. As a characteristic feature of this invention, in an image output system which includes an image input and output apparatus, PC, and server, the PC sends image data to be output by the image input and output apparatus to the server and sends information associated with the storage location of the image data to the image input and output apparatus, the server stores the image data received from the PC, and the image input and output apparatus prints the image data received from the PC and records the information associated with the storage location of the image data as log information about the image data.

7 Claims, 19 Drawing Sheets

(56) References Cited

U.S. PATENT DOCUMENTS

| | | |
|---|---|---|
| 2002/0120875 A1* | 8/2002 | Kiwada et al. ............. 713/201 |
| 2002/0159092 A1* | 10/2002 | Christodoulou et al. .... 358/1.15 |
| 2003/0196090 A1 | 10/2003 | Nagahama |
| 2003/0231331 A1* | 12/2003 | Tanaka ................. 358/1.13 |
| 2003/0234952 A1 | 12/2003 | Abe |
| 2005/0111051 A1* | 5/2005 | Uchikawa .............. 358/448 |
| 2005/0134897 A1* | 6/2005 | Mase ................... 358/1.15 |
| 2005/0144469 A1 | 6/2005 | Saitoh |
| 2006/0044592 A1 | 3/2006 | Wakana |
| 2006/0048019 A1 | 3/2006 | Takahashi |
| 2006/0279764 A1 | 12/2006 | Shimada |
| 2006/0288285 A1 | 12/2006 | Lai et al. |
| 2006/0290975 A1* | 12/2006 | Murakami et al. ......... 358/1.15 |
| 2007/0118760 A1* | 5/2007 | Masui .................... 713/189 |
| 2007/0133054 A1* | 6/2007 | Kobayashi et al. ........ 358/1.16 |
| 2007/0285712 A1 | 12/2007 | Komada |
| 2009/0116061 A1 | 5/2009 | Yasuhara |
| 2011/0255132 A1 | 10/2011 | Shimada |

FOREIGN PATENT DOCUMENTS

| | | | |
|---|---|---|---|
| JP | 2003-304243 A | 10/2003 | |
| JP | 2006081119 A | 3/2006 | |
| JP | 3821293 B2 | 6/2006 | |
| JP | 2006-246350 A | 9/2006 | |
| WO | WO2005/030878 * | 2/2006 | .......... 707/626 |

OTHER PUBLICATIONS

Office Action issued in corresponding Japanese Patent Application No. 2006-162809 dated May 9, 2011.
Japanese Office Action for JP2007-287850, dated Sep. 28, 2009. Cited in related co-pending application US 2009-0116061. English translation provided.
Michael J. Shelton, et al.; "Thumbnail or encoding history of jobs copied/printed/sent for audits"; Research Disclosure Journal, ISSN 0374-4353, Database No. 473025; Sep. 2003.
Japanese office Action issued in DIV of Japanese counterpart. Japanese application No. JP2011-147713, dated Mar. 4, 2013.

\* cited by examiner

IMAGE OUTPUT SYSTEM AND METHOD FOR LOGGING IMAGE DATA STORAGE LOCATION

BACKGROUND OF THE INVENTION

1. Field of the Invention

The present invention relates to an image output system, which comprises an image output apparatus for outputting image data, an information processing apparatus for transmitting the image data that is outputted from the image output apparatus, and a server apparatus connected to the image output apparatus and the information processing apparatus to facilitate communication with each other, and an information processing method.

2. Description of the Related Art

In recent years, along with increasing popularity of an image input and output apparatus, such as a multi-function peripheral, and networking thereof, problems of illicit use of the apparatus, and misappropriation of information thereby, have surfaced. On the other hand, a variety of proposals have been made to control the problems.

For example, Japanese Patent Laid-Open No. 06-268791 has proposed a system in which a detailed information of a job executed by each user is recorded as a log information in a large-capacity server, together with image data, so as to confirm, at a later date, who copied what, and when.

Furthermore, a system that detects an execution of an illicit job, and allows a follow-up research of a printed or transmitted image data, using the log information recorded in the server, has been proposed. The system would allow specifying the users who copied, printed, or transmitted a reference, and as well as the apparatus which was used in the job.

When the frequency of use of each image input and output apparatus in the system is high, however, the size of the log information transmitted to the server becomes huge. As a result, the network load upon transmitting the log information becomes heavier, thus lowering the operation performance of each image input and output apparatus.

On the other hand, in order to reduce the size of log information, the image data to be transmitted as log information may be compressed to have a low resolution or at a high compression ratio. In such a circumstance, the network load can be reduced. A new problem is posed, however: precision with regard to analyzing log information recorded in the server is degraded.

SUMMARY OF THE INVENTION

The present invention has been devised in consideration of the aforementioned problems, and has as its object to prevent the operation performance drop of an image input and output apparatus, upon recording a log information in a system that comprises the image input and output apparatus.

More specifically, an increase in network load and a decrease in analysis precision are avoided.

In order to achieve the above object, an image output system according to the present invention comprises the following arrangement. That is, the image output system comprises an image output apparatus that outputs image data, an information processing apparatus that sends the image data to the image output apparatus for outputting, and a server that is connected to apparatus, the server apparatus, the image output apparatus, and the information processing apparatus being communicatively connected with each other, the information processing apparatus comprising:
a first send unit configured to send the image data to the server apparatus; and
a second send unit configured to send information associated with a storage location, in the server apparatus, of the image data, the server apparatus comprising:
a storage unit configured to store the image data received from the information processing apparatus, and the image output apparatus comprising:
an output unit configured to output the image data received from the information processing apparatus; and
a recording unit configured to record the information associated with the storage location, in the server apparatus, of the image data.

According to the present invention, upon recording a log information in a system which comprises an image input and output apparatus, even when the frequency of use of the image input and output apparatus is high, the operation performance drop of the image input and output apparatus can be avoided.

More specifically, an increase in network load and a decrease in analysis precision can be avoided.

Further features of the present invention will become apparent from the following description of exemplary embodiments, with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Preferred embodiments of the present invention will now be described in detail, in accordance with the accompanying drawings.

First Embodiment

<1. Overall Arrangement of Image Output System>

Figure 1:
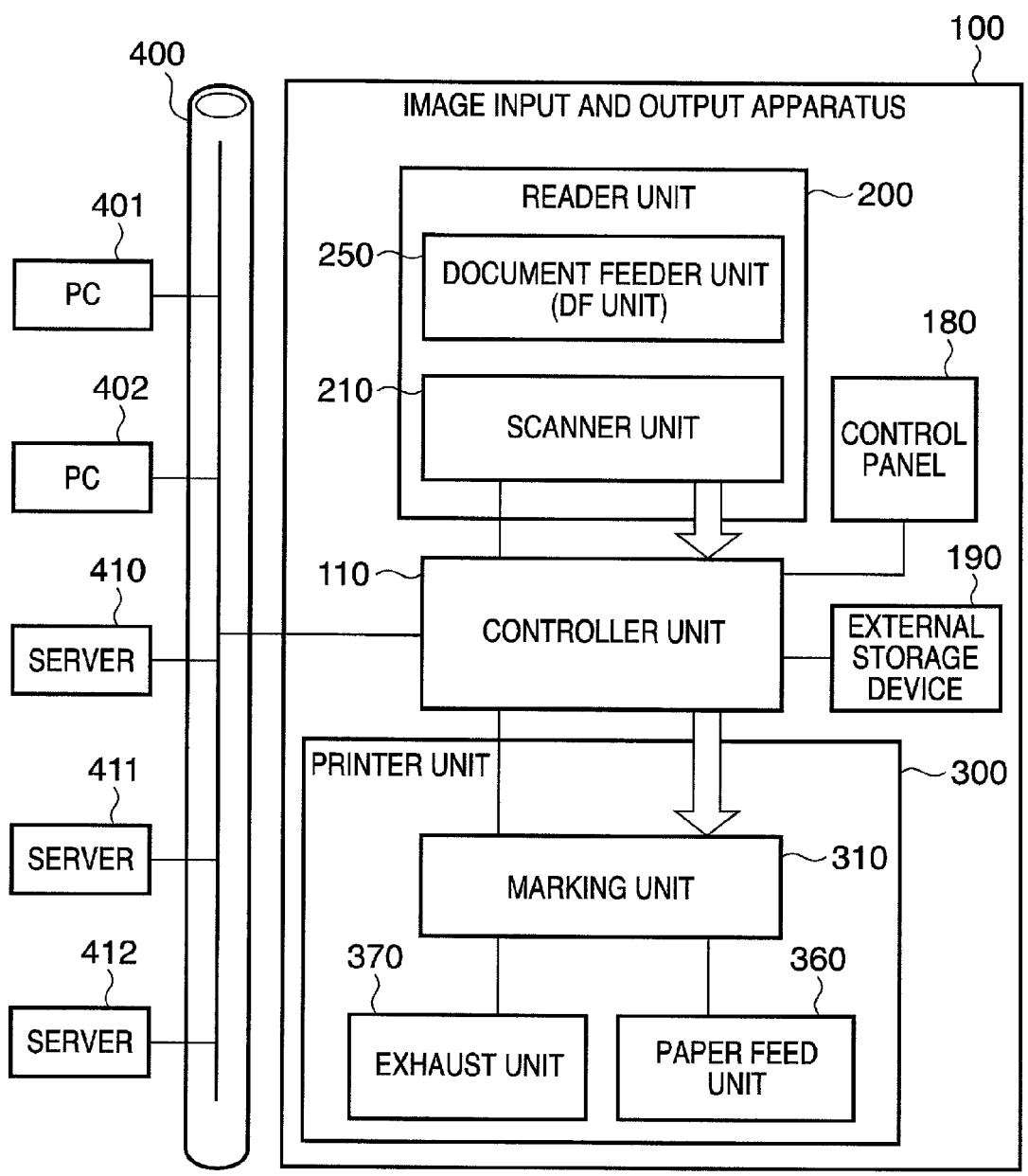
FIG. 1 is a block diagram showing an overall configuration of an image output system according to an embodiment of the present invention.

FIG. 1 is a block diagram showing an overall configuration of an image output system according to a first embodiment of the present invention. The image output system comprises an image input and output apparatus 100, comprising a copying machine or the like, host computers (PCs) 401 and 402, and servers 410 to 412, which are connected to the image input and output apparatus 100 via a network.

The image input and output apparatus 100 comprises a controller unit 110, a reader unit 200, and a printer unit 300.

The reader unit 200 optically scans a document image, which it converts into image data. The reader unit 200 comprises a scanner unit 210, which has a function of scanning a document image, and a document feeder unit 250, which has a function of conveying a document.

The printer unit 300 conveys a print sheet, prints image data on that sheet as a visible image, and discharges the printed sheet outside the apparatus. The printer unit 300 comprises a paper feed unit 360, which has a plurality of different types of paper cartridges. The printer unit 300 comprises a marking unit 310, which has a function of transferring and fixing image data on a print sheet. Furthermore, the printer unit 300 comprises a discharge unit 370, which has a function of sorting and stapling printed print sheets, and outputting the sheets outside the apparatus.

The controller unit 110 is electrically connected to the reader unit 200, the printer unit 300, and an external storage device 190, and is also connected to the PCs 401 and 402, and the servers 410 to 412, via the network 400. The controller unit 110 provides a copy function that controls the reader unit 200 to scan a document image, and controls the printer unit 300 to output image data onto a print sheet.

The controller unit 110 provides a scanner function that converts image data scanned by the reader unit 200 into code data, and transmits the code data to the PCs 401 and 402 via the network 400. Furthermore, the controller unit 110 provides a printer function that converts code data received from the PC 401 or 402 via the network into image data, and outputs the image data to the printer unit 300.

A control panel 180 is connected to the controller unit 110, and provides a user I/F which comprises a liquid crystal touch panel and is used to operate the image input and output apparatus 100.

The servers 410 to 412 are file/mail servers which can store image data, and have a function of an FTP server, a NetWare server, an SMB server, an SMTP server, and the like. Upon reception of a file download instruction from the controller unit 110 via the network 400, the corresponding server provides designated image data to the controller unit 110. Upon reception of a file upload instruction from the controller unit 110 via the network 400, the corresponding server stores designated image data.

<2. Hardware Arrangement of Reader Unit 200 and Printer Unit 300>

Figure 2:
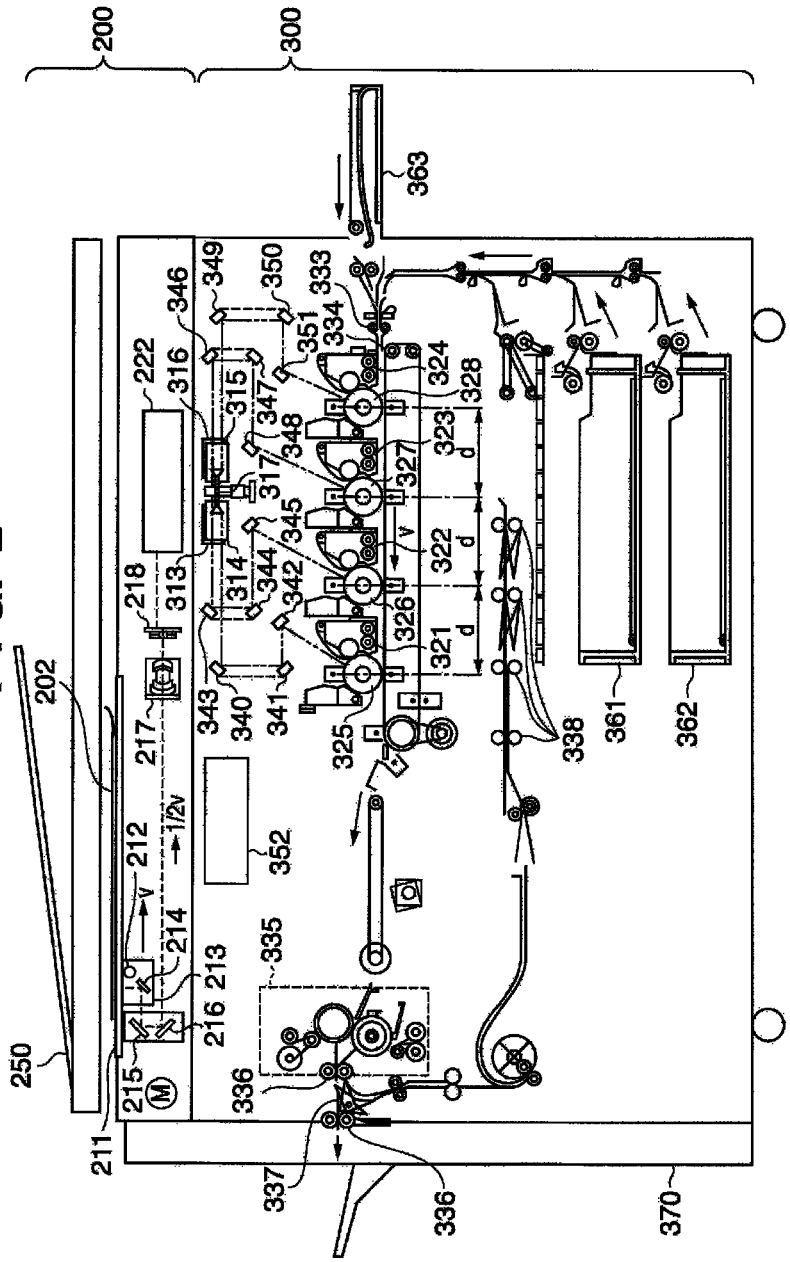
FIG. 2 is a sectional view showing a hardware configuration of a reader unit and printer unit.

FIG. 2 is a sectional view showing the hardware arrangement of the reader unit 200 and the printer unit 300. The document feeder unit 250 of the reader unit 200 feeds documents onto a platen glass 211 one by one in turn, starting with the first document, and discharges a document 202 on the platen glass 211 after completion of the document reading operation.

When a document is fed onto the platen glass 211, a lamp 212 is turned on, and an optical unit 213 then begins to move, thus scanning the document for exposure. Reflected light from the document at such a time is guided to a CCD image sensor (hereinafter "CCD") 218, via mirrors 214, 215, and 216, and a lens 217.

The CCD 218 reads the image of the document scanned thereby. Reference numeral 222 denotes a reader image processing circuit, which applies predetermined processing to image data output from the CCD 218, and outputs the processed data to the controller unit 110 (not shown in FIG. 2).

Reference numeral 352 denotes a printer image processing circuit, which outputs image data sent from the controller unit 110 (not shown in FIG. 2) to a laser driver 317.

The laser driver 317 of the printer unit 300 drives laser emission units 313, 314, 315, and 316, and controls the laser emission units 313 to 316 to emit laser beams according to image data output from the printer image processing circuit 352. The laser beams strike photosensitive drums 325 to 328 via mirrors 340 to 351, thus forming latent images therefrom on the photosensitive drums 325 to 328. Reference numerals 321 to 324 denote developers which develop the latent images with black (Bk), yellow (Y), cyan (C), and magenta (M) toners. The developed toner images of respective colors are transferred onto a print sheet, thus printing out a full-color image.

A print sheet, which is fed from one of paper cartridges 361 and 362 and a manual insert tray 363 at a timing synchronized with the start of irradiation of the laser beams, is drawn on, and conveyed by, a transfer belt via registration rollers 333. Toner images attached on the photosensitive drums 325, 326, 327, and 328 are transferred onto the print sheet. The print sheet on which the toner images are transferred is conveyed to a fixing unit 335, and the toner images are fixed on the print sheet by heat and pressure of the fixing unit 335. The print sheet that has passed through the fixing unit 335 is discharged by discharge rollers 336. The discharge unit 370 bundles and sorts exhausted print sheets, and staples the sorted print sheets.

When setting a 2-sided print mode, after the print sheet is conveyed to the position of the discharge rollers 336, the rotation direction of the discharge rollers 336 is reversed to guide the print sheet onto a re-feed convey path 338 by a flapper 337. The print sheet guided onto the re-feed convey path 338 is fed onto the transfer belt 334 at the aforementioned timing.

<3. Functional Configuration of the Reader Unit 200>

Figure 3:
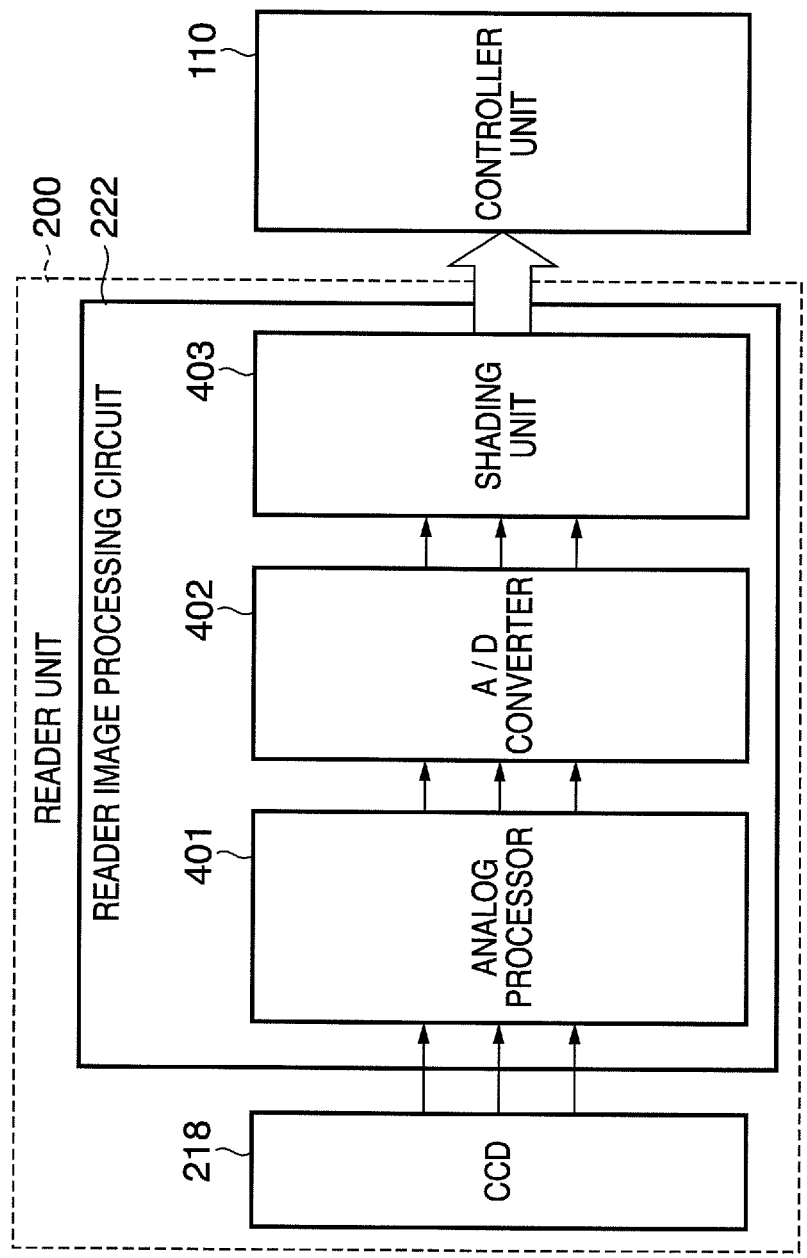
FIG. 3 is a block diagram showing a detailed configuration of a scanner unit 210 in the reader unit.

FIG. 3 is a block diagram showing a functional configuration of the reader image processing circuit 222 in the reader unit 200. The CCD 218 reads an image of a document on the platen glass 211 and converts it into an electrical signal. Note that the CCD 218 comprises a 1-line CCD, a 3-line CCD, or the like. When the CCD 218 comprises a 1-line CCD, RGB color filters are placed on the 1-line CCD inline in the order of R, G, and B. When the CCD 218 comprises a 3-line CCD, R, G, and B filters are arranged for respective CCDs. Note that the filters may be on-chip filters or may be arranged independently of the CCD.

The electrical signal, i.e., analog image data, that is outputted from the CCD 218 is inputted to the reader image processing circuit 222, and is sampled and held (S/H) by an analog processor 401. Furthermore, the analog processor 401 clamps the dark level of the analog image data to a reference potential, and amplifies the analog image data to a predetermined level. An A/D converter 402 then converts the analog image data into 8-bit RGB digital signals. A shading unit 403 applies shading correction and black correction to the RGB signals, and outputs the processed signals to the controller unit 110.

<4. Functional Configuration of Controller Unit 110

Figure 4:
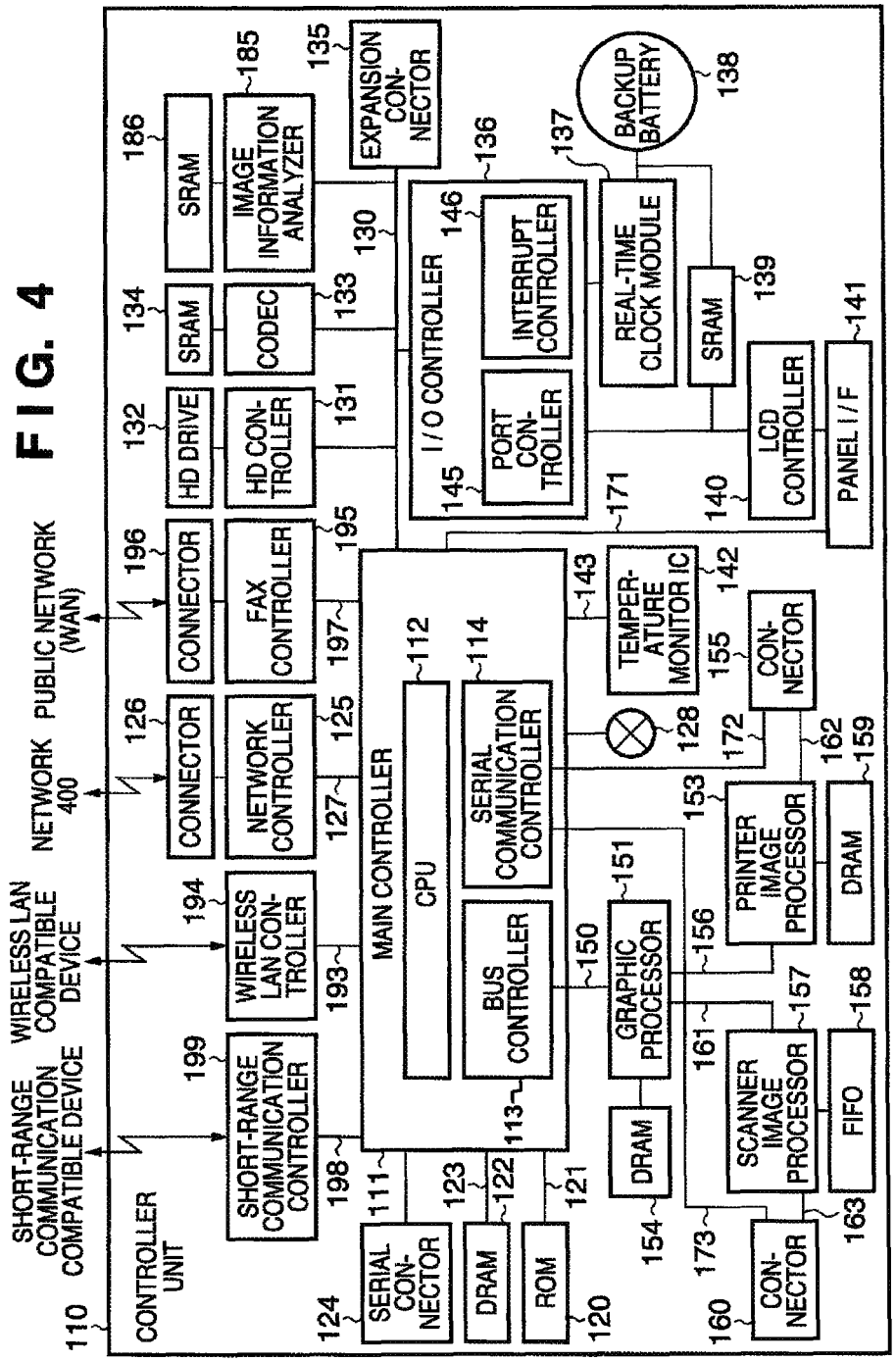
FIG. 4 is a block diagram showing a configuration of a controller unit.

FIG. 4 is a block diagram showing a configuration of the controller unit 110. A main controller 111 mainly comprises a CPU 112, a bus controller 113, and a serial communication controller 114 for various serial communications. The CPU 112 and bus controller 113 control the operation of the overall controller unit 110. The CPU 112 operates based on programs loaded from a ROM 120 via a ROM I/F 121.

The ROM 120 is a boot ROM, and stores program codes of an instruction group and the like, initial value data, table data, and the like that are required to execute the boot operation of the CPU 112. Also, the program describes an operation for interpreting code data (PDL data) in a page description language (PDL) received from the PC 401 or 402, and rasterizing the code data to raster image data. The bus controller 113 controls transfer of data input and output to and from respective I/Fs, and also controls arbitration at the time of bus contention and DMA data transfer.

A DRAM 122, which is connected to the main controller 111 via a DRAM I/F 123, serves as a work area that is used upon operation of the CPU 112. Also, the DRAM 122 serves as an image memory which temporarily stores image data read by the reader unit 200, to be printed out by the printer unit 300, as FAX transmission/reception data, and the like.

The asynchronous serial communication controller 114 exchanges control commands with CPUs of the reader unit 200 and printer unit 300 via serial buses 172 and 173 to communicate the inputs of the touch panel and keys on the control panel 180 therewith.

A network controller 125 is connected to the main controller 111 via an I/F 127, and is connected to the network 400 via a connector 126. As the network, Ethernet™ is generally available.

A FAX controller 195 is connected to the main controller 111 via an I/F 197, and is connected to a public network, i.e., a WAN, via a connector 196. As the public network, a public telephone network is generally available.

A wireless LAN controller 194 is connected to the main controller 111 via an I/F 193, and is connected to a wireless LAN compatible device via radio waves. The wireless LAN compatible device includes a PC, a portable phone, a PDA, a television, a server, another home electric appliance, and the like, which comply with a standard such as IEEE802.11/11b/11a/11g, and the like.

A short-range communication controller 199 is connected to the main controller 111 via an I/F 198 and is connected to a short-range communication compatible device via radio waves or IRDA (infrared). Short-range communication protocols include Bluetooth, UWB, IRDA (infrared), and the like, and the short-range communication compatible device includes a PC, a portable phone, a PDA, a wristwatch, a variety of authentication terminals, and the like.

A serial connector 124 is connected to the main controller 111 and communicates with external devices. As the serial bus, USB is generally available. A fan 128 is connected to the main controller 111 to cool down the controller unit 110.

A temperature monitor IC 142 is connected to the main controller 111 via a serial bus 143. The temperature monitor IC 142 is used in control of the fan 128, temperature correction of a real-time clock module 137, and the like.

To a general-purpose high-speed bus 130, an expansion connector 135 used to connect expansion boards, an I/O controller 136, a hard disk controller 131, a codec 133, and an image information analyzer 185 are connected. As the general-purpose high-speed bus, a PCI bus, PCI Express, and the like are generally available.

The codec 133 compresses multi-valued image data as raster image data stored in the DRAM 122 by JPEG or the like and binary image data by MH, MR, MMR or the like. Also, the codec 133 decompresses the compressed and stored code data to raster image data. An SRAM 134 is used as a temporary work area of the codec 133. DMA data transfer is made with the DRAM 122 under the control of the bus controller 113.

The image information analyzer 185 extracts and analyzes attribute information that is appended in advance to the read image data, i.e., image data that is printed out in an attribute-appended print mode. The attribute information is obtained by encoding information, including information associated with the storage location, such as the address and storage directory of the server 410, the file name of image data, and the like, and is appended on the image data as a digital watermark information, a barcode, a two-dimensional code, or the like. An SRAM 186 is used as a temporary work area of the image information analyzer 185. DMA data transfer is made with the DRAM 122 under the control of the bus controller 113.

The hard disk (HD) controller (to be referred to as HD controller hereinafter) 131 is used to connect a external storage device. According to the embodiment, a hard disk drive (to be referred to as HD drive hereinafter) 132 is connected via the I/F. The HD drive 132 stores operating system (OS) program codes, table data, and image data.

The I/O controller 136 controls a port controller 145 and an interrupt controller 146. A panel I/F 141 is connected to an LCD controller 140, and includes an I/F that is used to make a display on a liquid crystal display on the control panel 180, and a key input I/F used to make inputs of hardware keys and touch panel keys.

The control panel 180 has a liquid crystal display unit, a touch panel input device adhered on the liquid crystal display unit, and a plurality of hardware keys. A signal input by a touch panel key or hardware key is supplied to the CPU 112 via the aforementioned panel I/F 141. The liquid crystal display unit displays image data sent from the panel I/F 141. The liquid crystal display unit displays functions upon operating the image input and output apparatus 100, image data, and the like.

The real-time clock module 137 is used to update and save the date and time that are managed in the apparatus, and is maintained by a backup battery 138. An SRAM 139 is backed up by the backup battery 138, and stores a user mode, various kinds of setting information, file management information of the HD drive 132, and the like.

A graphics processor 151 applies image rotation, image scaling, color space conversion, binarization, scanner image input, and printer image output processes to image data stored in the DRAM 122. A DRAM 154 is used as a temporary work area of the graphics processor 151. The graphics processor 151 is connected to the main controller 111 via an I/F 150, and DMA data transfer is made with the DRAM 122 under the control of the bus controller 113.

Connectors 160 and 155 are respectively connected to the reader unit 200 and the printer unit 300, and include asynchronous serial I/Fs 173 and 172, and video I/Fs 163 and 162.

A scanner image processor 157 is connected to the reader unit 200 via the connector 160, and to the graphics processor 151 via a scanner bus 161. The scanner image processor 157 has a function of applying predetermined processing to an image received from the reader unit 200. Furthermore, the processor 157 has a function of outputting a control signal that is generated based on a video control signal sent from the reader unit 200 onto the scanner bus 161.

A FIFO 158 is connected to the scanner image processor 157, and is used to apply line correction to a video signal sent from the reader unit 200. A printer image processor 153 is connected to the printer unit 300 via the connector 155 and to the graphics processor 151 via a printer bus 156. The printer image processor 153 has a function of applying predetermined processing to image data output from the graphics processor 151 and outputting the image data to the printer unit 300. Furthermore, the processor 153 has a function of outputting a control signal generated based on a video control signal sent from the printer unit 300 onto the printer bus 162.

A DRAM 159 is connected to the printer image processor 153 and is used to delay a video signal by a predetermined period of time. The bus controller 113 controls transfer of raster image data rasterized on the DRAM 122 to the printer unit 300. The data is then DMA-transferred to the printer unit 300 via the graphics processor 151, the printer image processor 153, and the connector 155.

<5. Detailed Configuration of Respective Units of the Controller Unit 110>

<5.1 Detailed Configuration of Scanner Image Processor 157>

Figure 5:
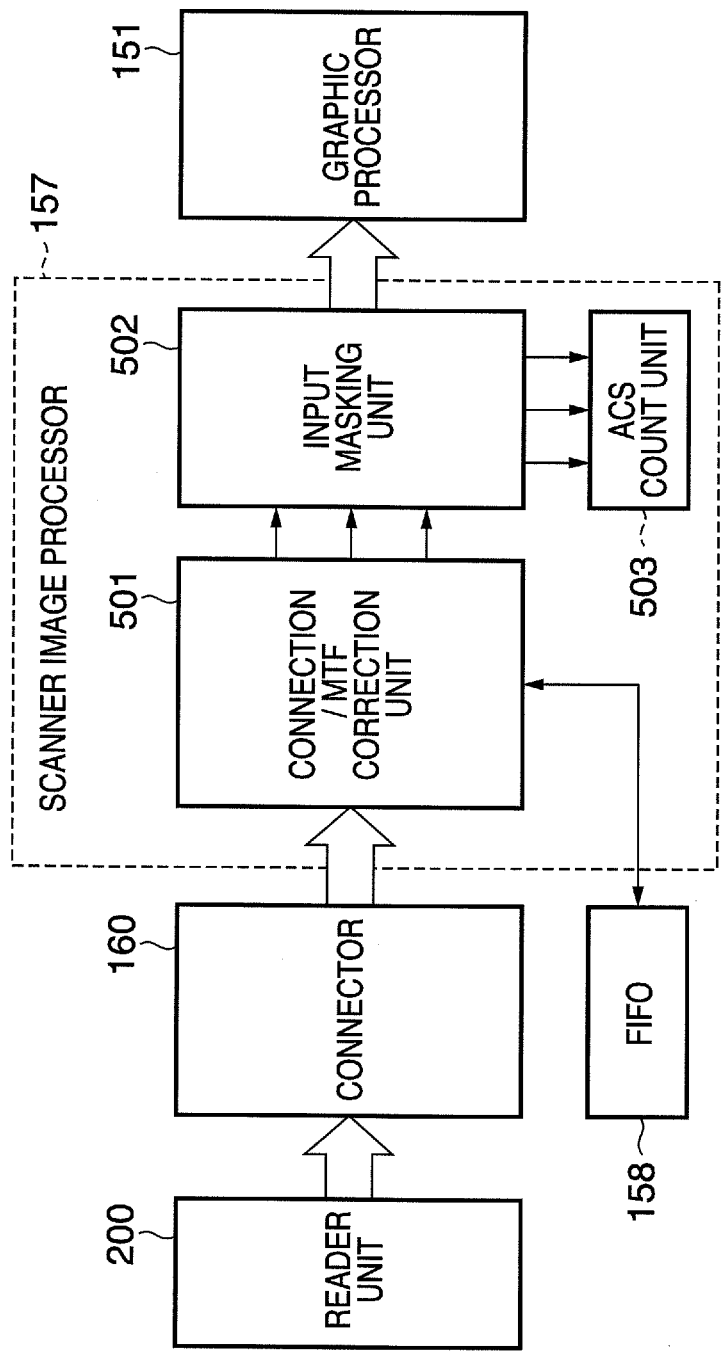
FIG. 5 is a block diagram showing a detailed configuration of a part associated with a scanner image processor.

FIG. 5 is a block diagram showing a detailed configuration of a part associated with the scanner image processor 157.

A connection/MTF correction unit 501 adjusts delay amounts for respective lines of image data that are sent from the reader unit 200 via the connector 160, in accordance with the scan speed, so as to correct the MTF that has changed depending on the scan speed. When the CCD 218 comprises a 3-line CCD, the connection processing corrects signal timings to obtain identical scan positions of three lines.

The FIFO 158 is used as a line delay buffer. An input masking unit 502 corrects the spectral characteristics of the CCD 218, the lamp 212, and the mirrors 214, 215, and 216 of the digital signals that have undergone the scan position timing correction. The outputs from the input masking unit 502 are sent to an auto color select (ACS) count unit 503 and the graphics processor 151.

The ACS count unit 503 makes a color determination by calculating a saturation for respective pixels, and checking the number of pixels that are greater than or equal to a given threshold, so as to determine if the document in question is a color or monochrome document. Even on a monochrome document, many color pixels exist around an edge in the microscopic view. Hence, using information of surrounding color pixels with respect to a pixel of interest, a check is performed to determine whether or not the pixel is actually a color pixel.

<5.2 Detailed Arrangement of Printer Image Processor 153>

Figure 6:
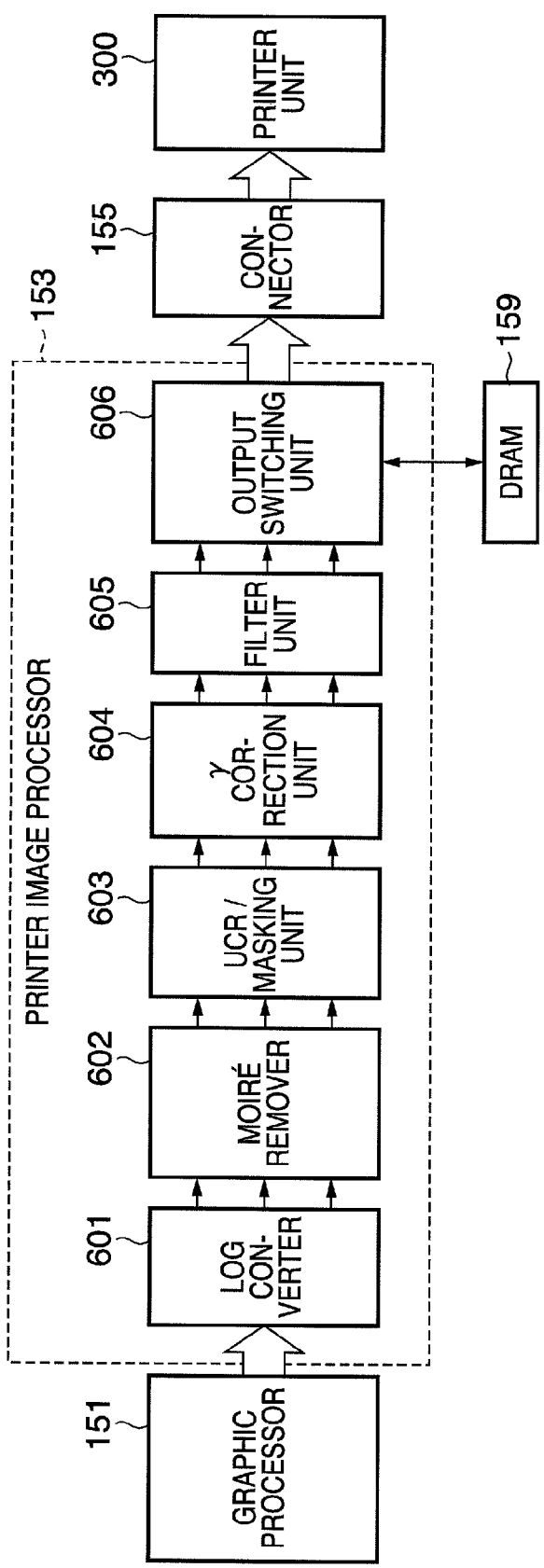
FIG. 6 is a block diagram showing a detailed configuration of a printer image processor.

FIG. 6 is a block diagram showing the detailed arrangement of the printer image processor 153.

Image data sent from the graphics processor 151 via the printer bus 156 is initially inputted to a log converter 601, which converts RGB signals into CMY signals by logarithmic conversion. A moiré remover 602 removes a moiré of the CMY signals.

Reference numeral 603 denotes a UCR/masking unit which generates CMYK signals based on the CMY signals that have undergone the moiré removal processing, so as to correct the CMY signals to the signals that are suited to the output to the printer unit 300. The signals that have been processed by the UCR/masking unit 603 undergo density adjustment by a γ correction unit 604, and then undergo smoothing or edge processing by a post-filter unit 605. An output switching unit 606 temporarily stores each of CMYK images in the DRAM 159 to correct a drum distance between the neighboring photosensitive drums 325 to 328, and sends the image that has undergone the drum distance correction to the printer unit 300 via the connector 155.

<5.3 Detailed Arrangement of Graphic Processor 151>

Figure 7:
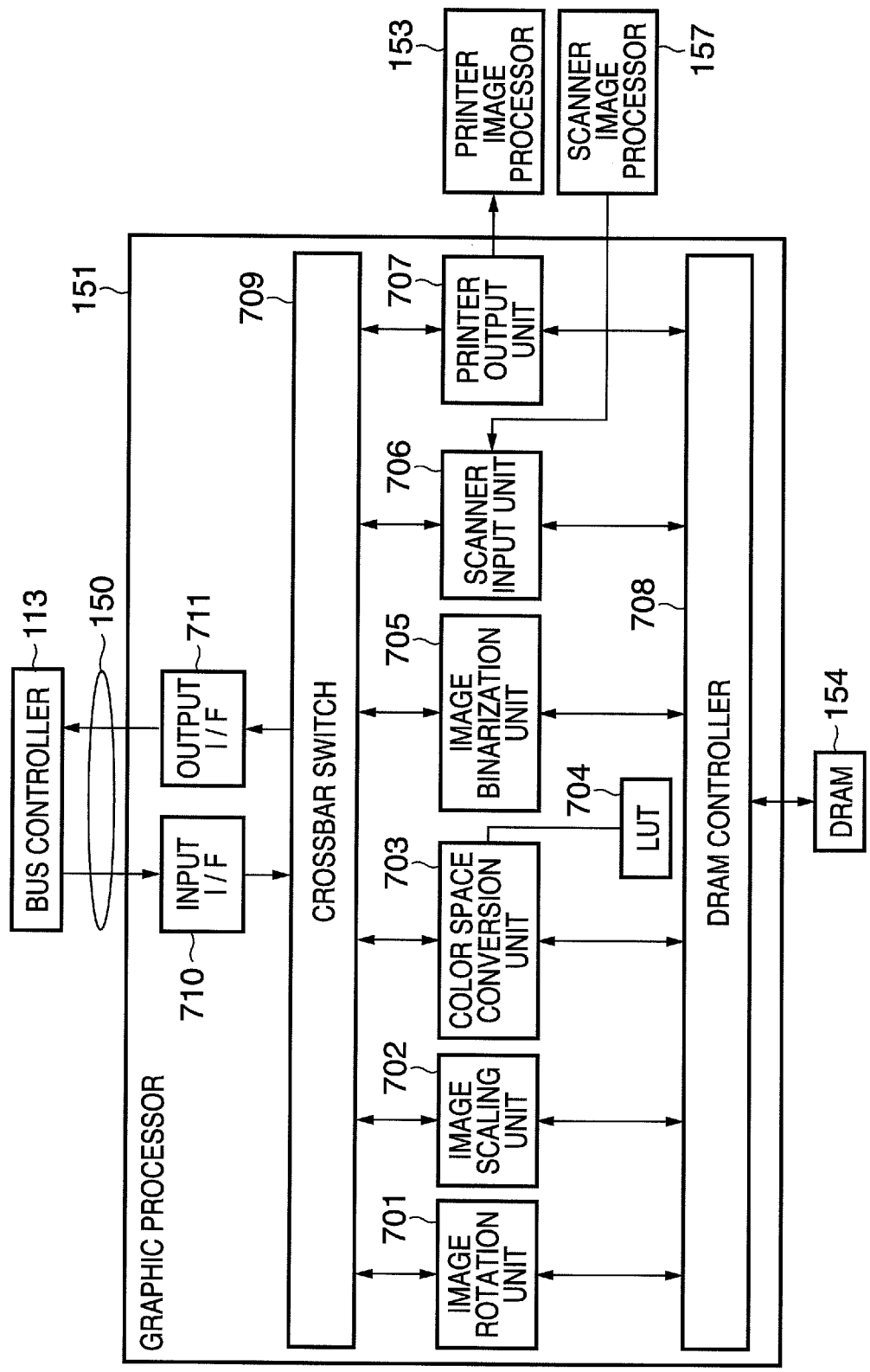
FIG. 7 is a block diagram showing a detailed configuration of a graphic processor.

FIG. 7 is a block diagram showing the detailed configuration of the graphics processor 151.

The graphics processor 151 has modules for respectively executing image rotation, image scaling, color space conversion, binarization, scanner image input, and printer image output processes. The DRAM 154 is used as a temporary work area of the respective modules via a DRAM controller 708. The DRAM controller 708 statistically assigns work areas to respective modules in advance so as to prevent contention of the work areas on the DRAM 154 that are used by the respective modules.

The graphics processor 151 is connected to the bus controller 113 in the main controller 111 via the I/F 150, and makes DMA data transfer with the DRAM 122 under the control of the bus controller 113. The bus controller 113 makes control for setting modes and the like in the respective modules of the graphics processor 151, and timing control required to transfer image data to the respective modules.

An input interface 710 inputs image data input from the I/F 150 to a crossbar switch 709. As the image data formats, binary raster image data, multi-valued raster image data, JPEG image data, and the like are handled. In case of a JPEG image, the input interface 710 converts the JPEG image data into raster image data, and outputs the converted data to the crossbar switch 709. An output interface 711 outputs image data input from the crossbar switch 709 to the I/F 150. The image data format input from the crossbar switch 709 is a raster image data, and the output interface 711 uses JPEG to compress the raster image data, and outputs the JPEG data to the I/F 150.

<5.3.1 Processing of Image Rotation Unit 701>

The processing sequence in an image rotation unit 701 will be described below. The CPU 112 makes settings for image rotation control in the bus controller 113 via the I/F 150. The bus controller 113 uses the settings to make settings required for image rotation in the image rotation unit 701, for example, an image size, a rotation direction, an angle, etc.

After the required setting is performed, the CPU 112 grants the bus controller 113 permission for image data transfer again. According to the permission, the bus controller 113 begins to transfer image data from the DRAM 122 or a device connected via each I/F.

It is presumed that an image size that is to undergo rotation is defined by 32 pixels×32 lines, and image data transfer is made to have 24 bytes for one pixel, i.e., 8 bits for each of R, G, and B, as a unit, when transferring image data. As per the foregoing, in order to obtain an image of 32 pixels×32 lines, the unit data transfer must be made 3232 times, and image data must also be transferred from discontiguous addresses.

Image data transferred by discontiguous addressing is written in the DRAM 154 so that it is rotated through a desired angle when it is read out. For example, in case of 90° counterclockwise rotation, transferred image data is written in the Y direction. When the written image data is read out in the X-direction, the image is rotated.

Upon completion of image rotation of 32 pixels×32 lines, i.e., writing in the DRAM 154, the image rotation unit 701 reads out image data from the DRAM 154 by the read-out method, and transfers the readout image data to the bus controller 113. Upon reception of the image data that has undergone the rotation processing, the bus controller 113 transfers data to the DRAM 122 or each device on the I/F by contiguous addressing. Such series of processes are repeated until all processing requests from the CPU 112 are processed, until processing for the required number of pages is completed.

<5.3.2 Processing of Image Scaling Unit 702>

The processing sequence in an image scaling unit 702 will be described below. The CPU 112 makes settings for image scaling control in the bus controller 113 via the I/F 150. The bus controller 113 uses the settings to make settings that are required for image scaling in the image scaling unit 702, such as scales in the main scan and sub-scan directions, an image size after scaling, etc. After the required settings, the CPU 112 grants the bus controller 113 permission for image data transfer again. According to the permission, the bus controller 113 begins to transfer image data from the DRAM 122 or a device connected via each I/F.

The image scaling unit 702 temporarily stores received image data in the DRAM 154, and enlarges or reduces an image by applying interpolation processing for the required numbers of pixels and lines according to the main scan and sub-scan scales to the stored data using the DRAM 154 as an input buffer. The image scaling unit 702 writes back the data after scaling in the DRAM 154 again, and reads out the image data from the DRAM 154 and transfers the readout image data to the bus controller 113, using the DRAM 154 as an output buffer. Upon reception of the image data that has undergone the scaling processing, the bus controller 113 transfers the image data to the DRAM 122 or each device on the I/F.

<5.3.3 Processing of Color Space Conversion Unit 703>

Following is a description of the processing sequence in a color space conversion unit 703. The CPU 112 makes settings for color space conversion control in the bus controller 113 via the I/F 150. The bus controller 113 uses the settings to make settings that are required for the color space conversion processing in the color space conversion unit 703 and a lookup table (LUT) 704, such as coefficients of a matrix operation (to be described hereinafter), table values of the LUT 704, etc.

After the required settings, the CPU 112 grants the bus controller 113 permission for image data transfer again. According to the permission, the bus controller 113 begins to transfer image data from the DRAM 122 or a device connected via each I/F. The color space conversion unit 703 applies a predetermined matrix operation for each pixel of the received image data.

Next, the data after the matrix operation undergoes conversion by the LUT 704. The conversion also allows an application of nonlinear conversion. Of course, by setting a through table, LUT conversion can be practically skipped. The color space conversion unit 703 transfers the image data that has undergone the color space conversion processing to the bus controller 113. Upon reception of the image data that has undergone the color space conversion processing, the bus controller 113 transfers the data to the DRAM 122 or each device on the I/F.

<5.3.4 Processing of Image Binarization Unit 705>

Following is a description of a processing sequence in an image binarization unit 705. The CPU 112 makes settings for binarization control in the bus controller 113 via the I/F 150. The bus controller 113 uses the settings to make settings that are required for binarization processing in the image binarization unit 705, such as various parameters according to a conversion method, etc.

After the required settings, the CPU 112 grants the bus controller 113 permission for image data transfer again. According to the permission, the bus controller 113 begins to transfer image data from the DRAM 122 or a device connected via each I/F. The image binarization unit 705 applies binarization processing to the received image data.

According to the embodiment, as the binarization method, image data is simply binarized by comparing the data with a predetermined threshold. Of course, the present invention may use any other method such as dithering, error diffusion, an improved method of error diffusion, and the like.

The image binarization unit 705 transfers the image data that has undergone the binarization processing to the bus controller 113. Upon reception of the image data that has undergone the binarization processing, the bus controller 113 transfers the data to the DRAM 122 or each device on the I/F.

<5.3.5 Processing of Scanner Input Unit 706>

The processing sequence in a scanner input unit 706 will be described below.

The CPU 112 makes settings for scanner input control in the bus controller 113. The bus controller 113 uses the settings to make required settings in the scanner input unit 706 via the I/F 150, such as various parameters according to input processing, etc. After the required settings, the CPU 112 grants the bus controller 113 permission for image data transfer again.

The image data is inputted to the scanner input unit 706 in synchronism with a sync signal input from the scanner image processor 157. The scanner input unit 706 temporarily stores the received image data in the DRAM 154 as an input buffer. The scanner input unit 706 then transfers the image data stored in the DRAM 154 to the bus controller 113. Upon reception of the image data from the scanner input unit 706, the bus controller 113 transfers the data to the DRAM 122 or each device on the I/F.

<5.3.6. Processing of Printer Output Unit 707>

Following is a description of a processing sequence in a printer output unit 707 will be described below. The CPU 112 makes settings for printer output control in the bus controller 113 via the I/F 150. The bus controller 113 uses the settings to make required settings in the printer output unit 707, such as various parameters according to output processing, etc.

After the required settings, the CPU 112 grants the bus controller 113 permission for image data transfer again. According to the permission, the bus controller 113 begins to transfer image data from the DRAM 122 or a device connected via each I/F. The printer output unit 707 temporarily stores the received image data in the DRAM 154. The printer output unit 707 outputs the image data stored in the DRAM 154 to the printer image processor 153 in synchronism with a sync signal input from the printer image processor 153.

<6. Overview of Control Panel>

Figure 8:
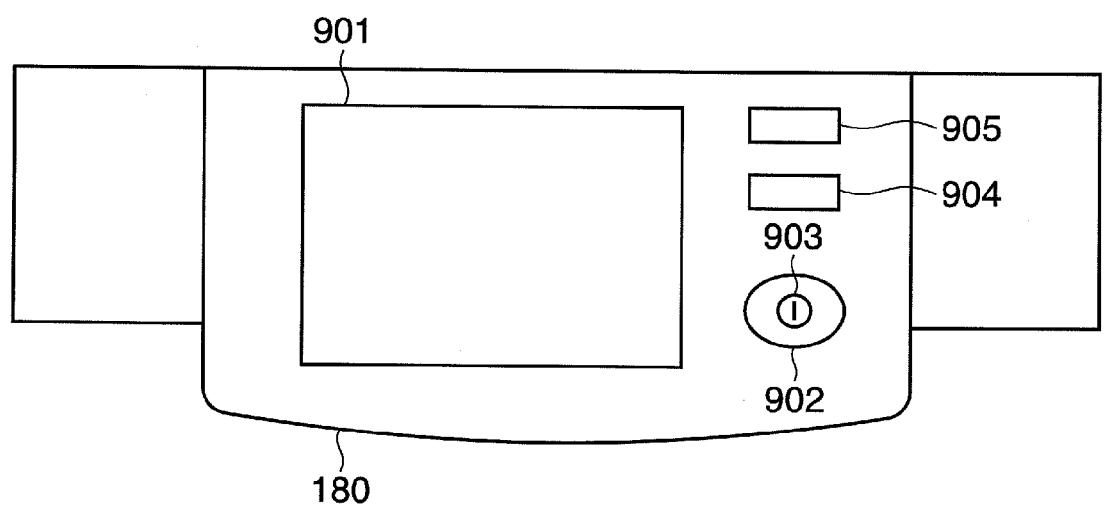
FIG. 8 is a schematic view showing a configuration of a control panel.

FIG. 8 is a schematic view showing a configuration of the control panel 180. An LCD display unit 901 is prepared by adhering a touch panel sheet on an LCD. The LCD display unit 901 displays an operation window of the system, and informs the CPU 112 of the controller unit 110 of position information of a certain key displayed on the touch panel when the key is depressed. A start key 902 is used to start, e.g., a document scanning operation. Green and red two-color LEDs are arranged at the central portion of the start key 902 and are used to indicate whether or not the start key is ready to use, depending on the color. A stop key 903 is used to stop an active operation. An ID key 904 is used to input a user ID. A reset key 905 is used to reset settings from the control panel 180.

<6.1 Operation Window>

Figure 9:
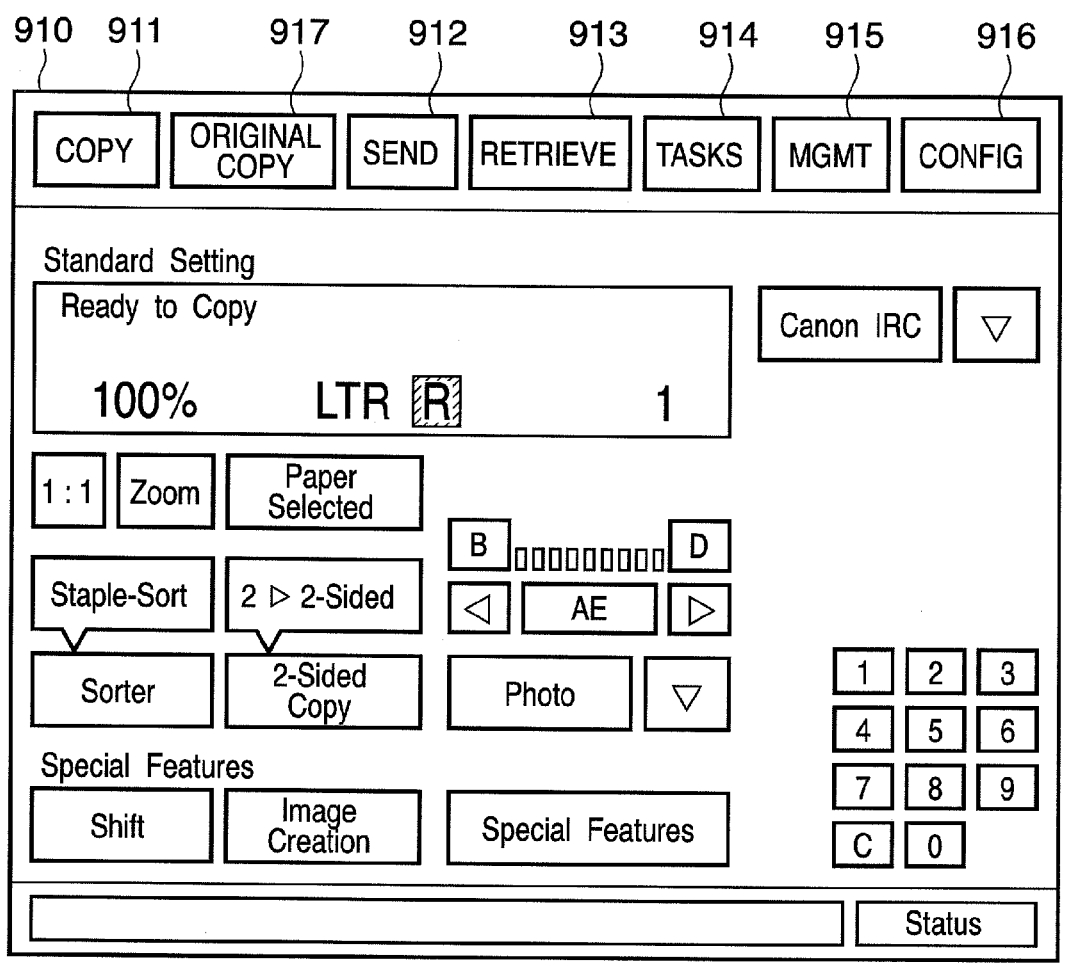
FIG. 9 shows an operation window displayed on the control panel.

FIG. 9 shows an example of the operation window displayed on the control panel 180. Functions provided by the image input and output apparatus 100 are classified into the following seven major categories:

Copy;
Original Copy;
Send;
Retrieve;
Tasks;
Management; and
Configuration.

The categories correspond to seven main tabs displayed on the upper portion of an operation window 910. More specifically, the categories correspond to a "COPY" tab 911, an "ORIGINAL COPY" tab 917, a "SEND" tab 912, a "RETRIEVE" tab 913, a "TASKS" tab 914, a "MGMT" tab 915, and a "CONFIG" tab 916.

By pressing each of the main tabs, the operation window is switched to a window of the corresponding category. When switching to another category is inhibited, the display color of the main tabs changes, and no reaction is made upon depressing the main tab.

The category "Copy" has a function of making normal document copying using the reader unit 200 and the printer unit 300 of the apparatus. Also, the category "Copy" has a function of copying a document using a printer unit 300 connected to the reader unit 200 of the apparatus via the network, i.e., a remote copy.

The category "Original Copy" has a function of printing out image data stored in the server 410 in a copy mode. A document is used that is obtained by appending attribute information including information associated with a storage location such as an address, a directory, a file name, and the like of image data to the image data, and outputting the image data on a print sheet. That is, the function extracts the attribute information from the printed image data to determine the storage location of original digital data of the image data, and retrieves and prints out image data in the corresponding server, one of 410 to 412.

The category "Send" has a function of transferring a document placed on the reader unit 200 of the apparatus, such as e-mail data, fax data, or file transfer protocol (FTP) data to a remote printer or database, and can designate a plurality of destinations.

The category "Retrieve" has a function of retrieving a document in an external device, and printing it using the printer unit 300 of the apparatus. As a document retrieval means, a Web browser, e-mail, FTP, or a fax can be used.

The category "Tasks" has a function of automatically processing an externally received document such as a fax document, an Internet print document, or the like, and generating and managing a task required to periodically execute the "Retrieve" function. The category "Management" has a function of managing jobs, an address book, a bookmark, a document account information, and the like. The category "Configuration" has a function of making settings, i.e., a network, a clock, etc. associated with the apparatus.

<7. Software Configuration>

Figure 10:
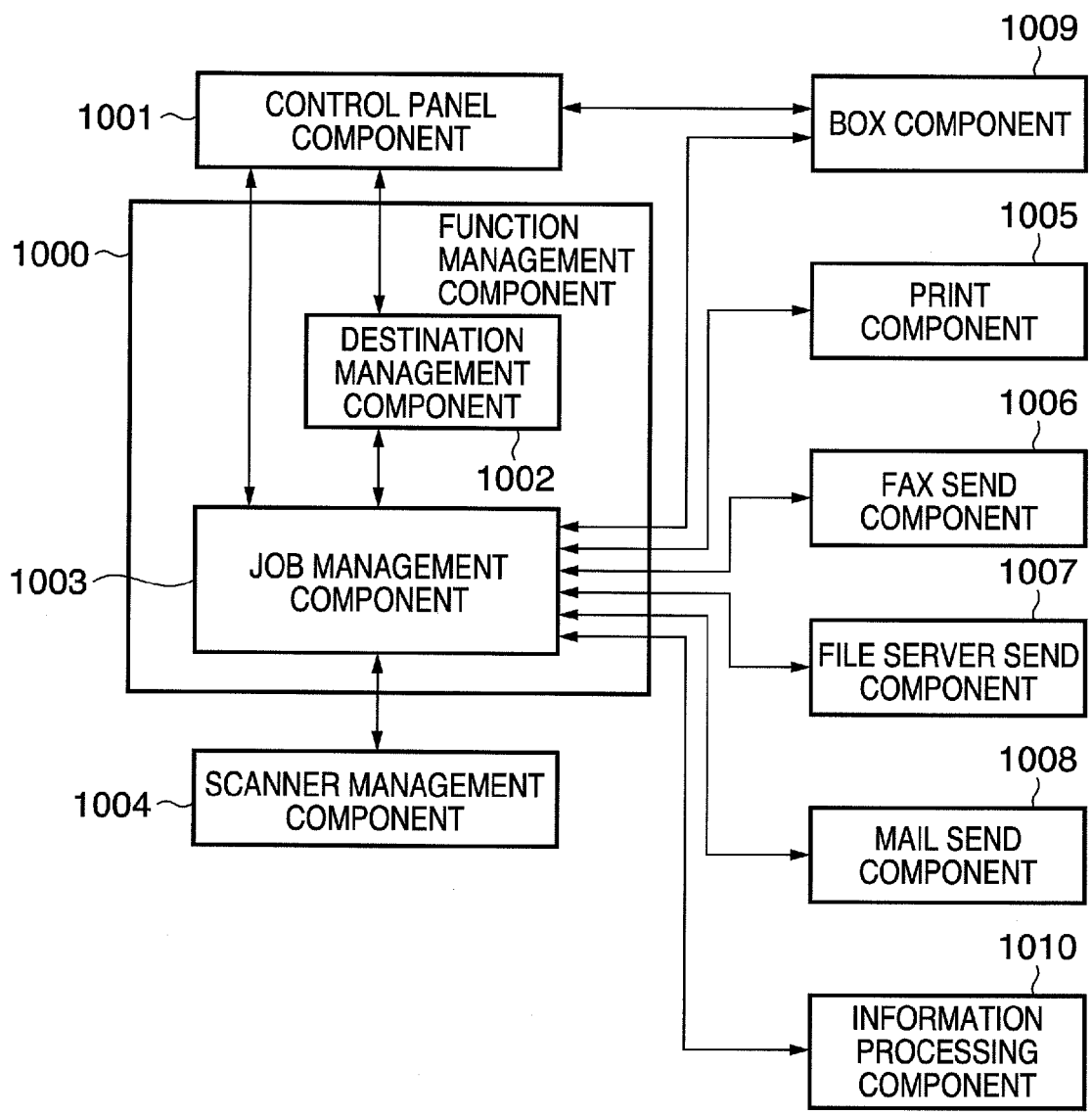
FIG. 10 is a block diagram showing a software configuration of an image input and output apparatus.

FIG. 10 is a block diagram showing a software configuration of the image input and output apparatus 100.

A control panel component 1001 retrieves various kinds of information by touch key operations at the control panel 180 by the user. For example, in case of the "copy" function, the information to be retrieved includes the resolution, the monochrome or color type, the number of copies, and the like for a document to be copied.

Also, in case of the "send" function, the information to be retrieved includes the resolution, the monochrome or color type, a send protocol, an image format upon sending, a send destination, an additional text information, and an information indicating whether or not the additional text information is superimposed on an image for image data to be sent. Furthermore, in such a circumstance, the information to be retrieved includes information indicating whether or not to append a thumbnail, information indicating whether or not to append the number of pages, the save destination of a scanned image, selection information of the saved image, information indicating whether or not to encrypt image data, and the like.

A function management component 1000 includes a destination management component 1002 and a job management component 1003, which performs a job control between a scanner management component 1004 and a respective send component. The function management component 1000 instructs the scanner management component 1004 to scan a document, based on a processing instruction selected by the control panel component 1001. In case of the "send" function, the component 1000 controls the destination management component 1002 to retrieve destination information. The component 1000 issues a processing instruction of the scanned image data to a print component 1005 or a fax send component 1006. Else, the component 1000 issues the processing instruction to a file server send component 1007, a mail send component 1008, a box component 1009, or an information processing component 1010.

The print component 1005 can send a plurality of scanned image data to the printer unit 300 to print the image data.

The fax send component 1006 can send a plurality of scanned image data to the fax controller 195 to send the data as fax data to another fax apparatus on the public network.

The file server send component 1007 converts a plurality of scanned image data into one image file using three protocols, i.e., FTP, NetWare, and SMB. The component 1007 sends the image file to arbitrary file servers 410 to 412 on the network, via the network controller 125.

The mail send component 1008 converts a plurality of scanned image data into one image file using an SMTP protocol, and sends the image file to arbitrary file servers 410 to 412 on the network, via the network controller 125.

The box component 1009 can send image data to an information storage area (hereinafter "box") for each user, which is set in advance on the HD drive 132 of the image input and output apparatus 100.

The information processing component 1010 can control the image information analyzer 185 to analyze a digital watermark information, a barcode information, a two-dimensional code information, or the like, and can execute a process that is required thereby. In a log creation mode, the component 1010 analyzes attribute information appended to the PDL data that is sent from the PC 401.

<8. Two-dimensional (QR) Code>

Following is a description of the barcode information and the two-dimensional code information as one of schemes used as attribute information in the "original copy" function. A barcode is constituted by wide bars, narrow bars, corresponding spaces, and a margin, which is used to distinguish a symbol proper from the background. A code expressed by the barcode can be determined by identifying the existence of the components and calculating the ratio of bars and spaces.

On the other hand, when an information symbol is expressed by a two-dimensional code, e.g., the QR code or the like, it can be similarly determined, because the information is included in two dimensions, compared to one dimension of the barcode.

Figure 11A:
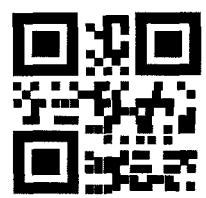
FIG. 11A shows a two-dimensional code, i.e., a QR code.
Figure 11B:
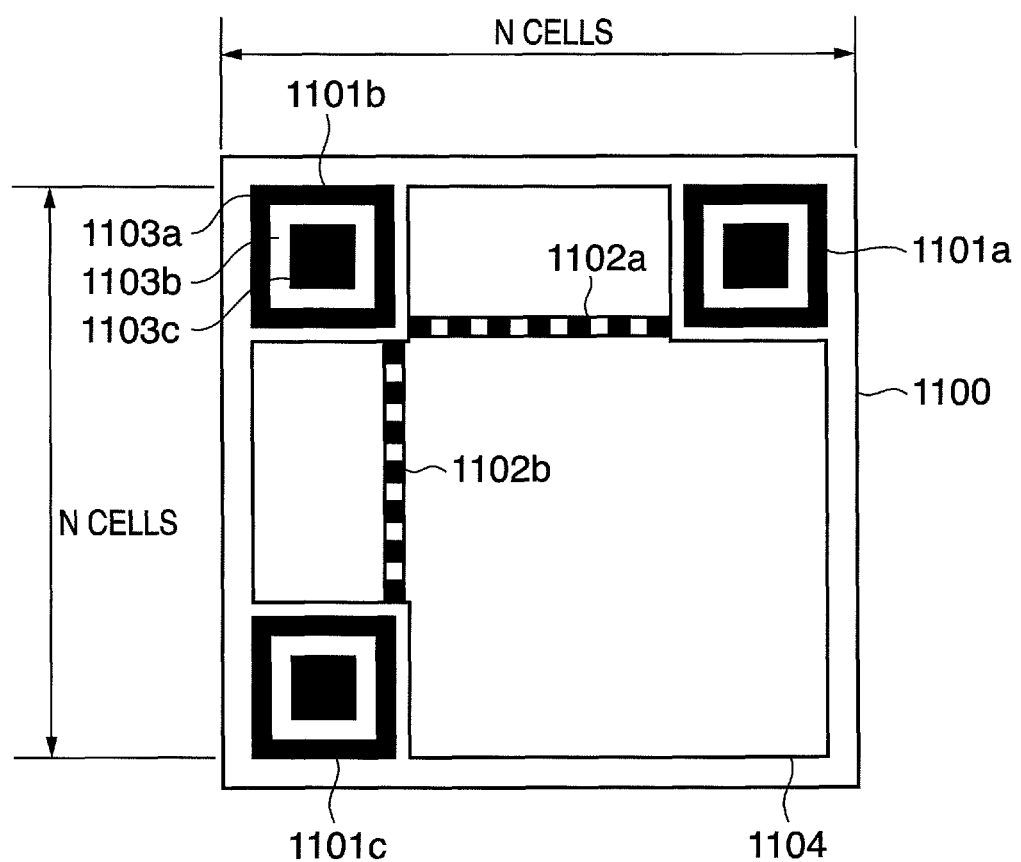
FIG. 11B is an enlarged view of the two-dimensional code, i.e., the QR code.

FIG. 11A shows a two-dimensional code, i.e., the QR code, and FIG. 11B is an enlarged view of the two-dimensional code, i.e., the QR code. The interior of a QR code 1100 is divided into n×n square boxes (hereinafter "cells"), and the QR code 1100 comprises three alignment symbols 1101a, 1101b, and 1101c. The QR code 1100 comprises a timing cells 1102a and 1102b, which serve as reference patterns. Furthermore, the QR code 1100 comprises a data cell 1104. In FIG. 11B, all of the data cells 1104 are illustrated as white cells for the sake of easy understanding.

Note that each of the alignment symbols 1101a, 1101b, and 1101c is prepared by combining a square with a specific dimension ratio. By identifying the alignment symbols, the existence and direction of the two-dimensional code (QR code) 1100 can be easily detected, even when the code 1100 tilts or is reversed.

For example, assume that the alignment symbol 1101b is a figure formed when the following squares are overlaid at the center:

a black square 1103a, the length of one side of which corresponds to seven cells;

a white square 1103b, the length of one side of which corresponds to five cells; and a black square 1103c, the length of one side of which corresponds to three cells.

Upon evaluating the black and white ratio of pixels by linearly crossing the alignment symbol 1101b near its center, a pattern of black, white, black, white, and black is detected at a ratio 1:1:3:1:1. By exploiting the nature thereof, when the black and white pattern is detected at the ratio, the pattern is determined as a candidate of the alignment symbols 1101a, 1101b, and 1101c.

Each of timing cells 1102a and 1102b is formed by alternatively combining white and black cells, and serves as a reference pattern that provides indices of respective data cell positions.

The data cells 1104 form an area obtained by excluding the reference patterns and timing cells, and each data cell is color-coded to white or black, so that each data cell corresponds to one bit of data.

Since the three alignment symbols 1101a, 1101b, and 1101c are located at three out of the four corners of a square, the positions thereof can be calculated by a pattern calculation. Since the timing cells 1102a and 1102b exist between the neighboring alignment symbols, the positions of the data cells 1104 can be calculated.

By checking if the color near the center of each data cell whose position has been determined, is black or white, black is associated with, e.g., 1, and white is associated with, e.g., 0, so that each data cell can be recognized as binary data and can be decoded.

<9. Procedure of Processing in Image Output System>

Following is a description of as a procedure of processing in the image output system according to the embodiment, especially the procedures of processing in a normal copy mode, an original copy mode, and a print output mode. In the image output system according to the embodiment, when the image input and output apparatus is set in a log creation mode, the log information is recorded upon the execution of such processing. The log information stored in the normal copy mode and the original copy mode is generated and recorded by the conventional method. On the other hand, the log information that is stored in the print output mode is recorded using a method according to the present invention.

Assume that the log information includes image data associated with various kinds of image input and output processing executed by the image input and output apparatus, and history information associated with the image input and output processing. The history information includes information that specifies a user who instructed the image input and output processing, a date and time of execution of the image input and output processing, and various kinds of setting information in the image input and output processing.

<9.1 Sequence in Normal Copy Mode>

Figure 12:
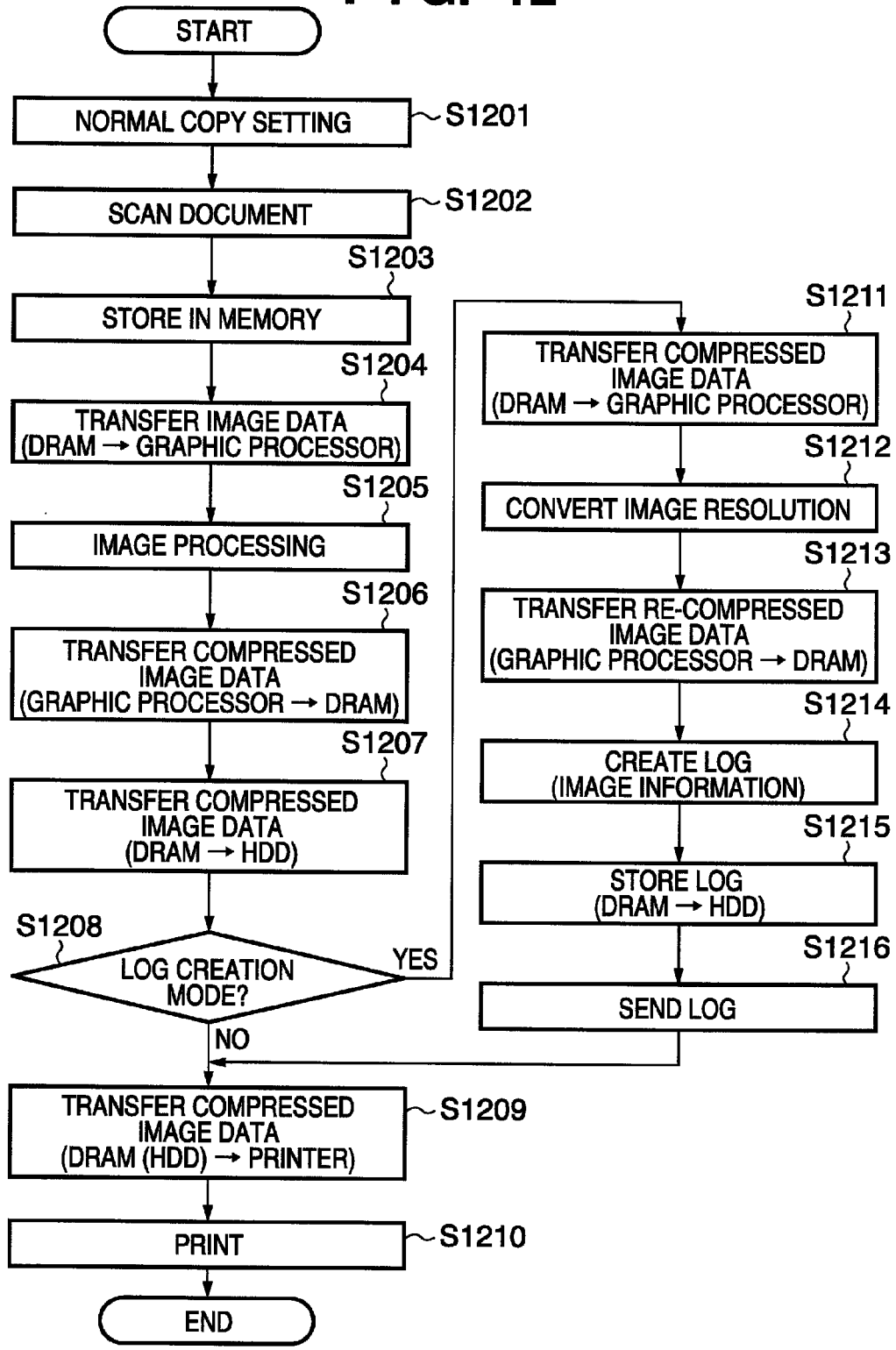
FIG. 12 is a flowchart showing a sequence of a normal copy operation.

FIG. 12 is a flowchart showing a normal copy operation sequence.

Upon outputting a copy image, the user makes copy settings of the copy image output job on the control panel 180 in step S1201. The copy setting content includes the number of copies, paper size, single- or double-sided, enlargement or reduction in scale, switching sorted output or stapling on or off, and the like.

In step S1202, the main controller 111 of the controller unit 110 controls the reader unit 200 via the connector 160, based on a normal copy start instruction, that is issued on the control panel 180, to execute a scan operation of image data of the documents.

The document feeder unit 250 feeds placed documents one by one onto the platen glass 211, and simultaneously detects the document size at that time. The document feeder unit 250 exposes and scans each document based on the detected document size to scan image data. In step S1203, the scanned image data is compressed in an image format designated by the graphic processor 151, and is stored in the DRAM 122.

Assume that the image data is scanned at a size equal to the size of the original, i.e., 100%, irrespective of the setting contents of the enlarge/reduce scale in the copy settings, and the graphics processor 151 (to be described hereinafter) executes the scaling processing in both the main scan and sub-scan directions.

In step S1204, the main controller 111 transfers the image data on the DRAM 122 to the graphics processor 151.

In step S1205, the graphics processor 151 executes image processing based on the copy setting parameters. For example, when an enlarge scale=400% is set, the image scaling unit 702, as a module in the graphics processor 151, executes scaling processing in both the main scan and the sub-scan directions. Upon completion of the image processing of the image data, the process advances to step S1206.

In step S1206, the graphics processor 151 compresses the image data that has undergone the image processing in the designated image format, and transfers the compressed data to the main controller 111. The main controller 111 stores the transferred compressed image data in the DRAM 122.

In step S1207, the main controller 111 converts the compressed image data stored on the DRAM 122 into a file in a designated file format. The main controller 111 transfers the compressed image data file to the HD drive 132 via the HD controller 131, storing the scanned compressed image data file on the HD drive The operation is repeated as long as documents to be scanned remain on the document feeder unit 250.

A detection is performed in step S1208 if the log creation mode is set. The administrator sets the log creation mode in the image input and output apparatus 100 in prior to running a process. If it is determined in step S1208 that the log creation mode is not set, the process advances to step S1209. If it is determined in step S1208 that the log creation mode is set, the log creation processing, including the image data itself, is executed as in step S1211 and subsequent steps.

In step S1211, the main controller 111 transfers the compressed image data on the DRAM 122 to the graphics processor 151.

In step S1212, the graphics processor 151 decompresses the image data and converts the decompressed image data to a resolution that is determined in advance to generate image data for the log. Else, the graphics processor 151 re-compresses the decompressed image data at a predetermined compression ratio.

In step S1213, the graphics processor 151 transfers the re-compressed image data after the image processing to the main controller 111. The main controller 111 stores the transferred re-compressed image data in the DRAM 122.

In step S1214, the main controller 111 creates the log information, including, as image data, the re-compressed image data stored on the DRAM 122 in step S1213. Note that the log information includes the re-compressed image data themselves as image data, a job ID set by the image input and output apparatus 100, the user name whose print instruction was received, a date and time of reception of the print instruction, and the number of print pages. After that, the process advances to step S1215. The log information may include the normal copy setting content that was made in step S1201.

In step S1215, the main controller 111 records the log information in the HD drive 132. In step S1216, the image input and output apparatus 100 sends the log information to the server 410. According to the embodiment, the log information is sent to the server 410 at the timing of step S1216. However, since the log information is recorded on the HD drive 132, it may be sent at another send timing. Also, any of the servers 410, 411, and 412 may be identical.

In step S1209, the main controller 111 transfers the compressed image data to the printer unit 300. In such a circumstance, if no image data to be printed out exists on the DRAM 122, the main controller 111 loads an image file from the HD drive 132 and stores it in the DRAM 122. The main controller 111 transfers the image data on the DRAM 122 to the printer unit 300 at an appropriate timing while controlling the printer unit 300 via the graphics processor 151, the printer image processor 153, and the connector 155.

In step S1210, the controller unit 110 controls the printer unit 300 to print out the image data.

Upon completion of transfer of all image data, i.e., upon completion of the copy job, the printout processing ends.

Note that step S1208 of checking whether or not the log creation mode is set may be executed between steps S1202 and S1203. Execution of the image processing for the normal copy operation starts under the condition of the completion of the generation and the transmission of the log information. Thus, the log information can be generated before the execution of the image processing for actual copying, and only the normal copy operation can be prevented from being executed without generating log information for some reason.

<9.2 Sequence of Original Copy Operation>

Figure 13A:
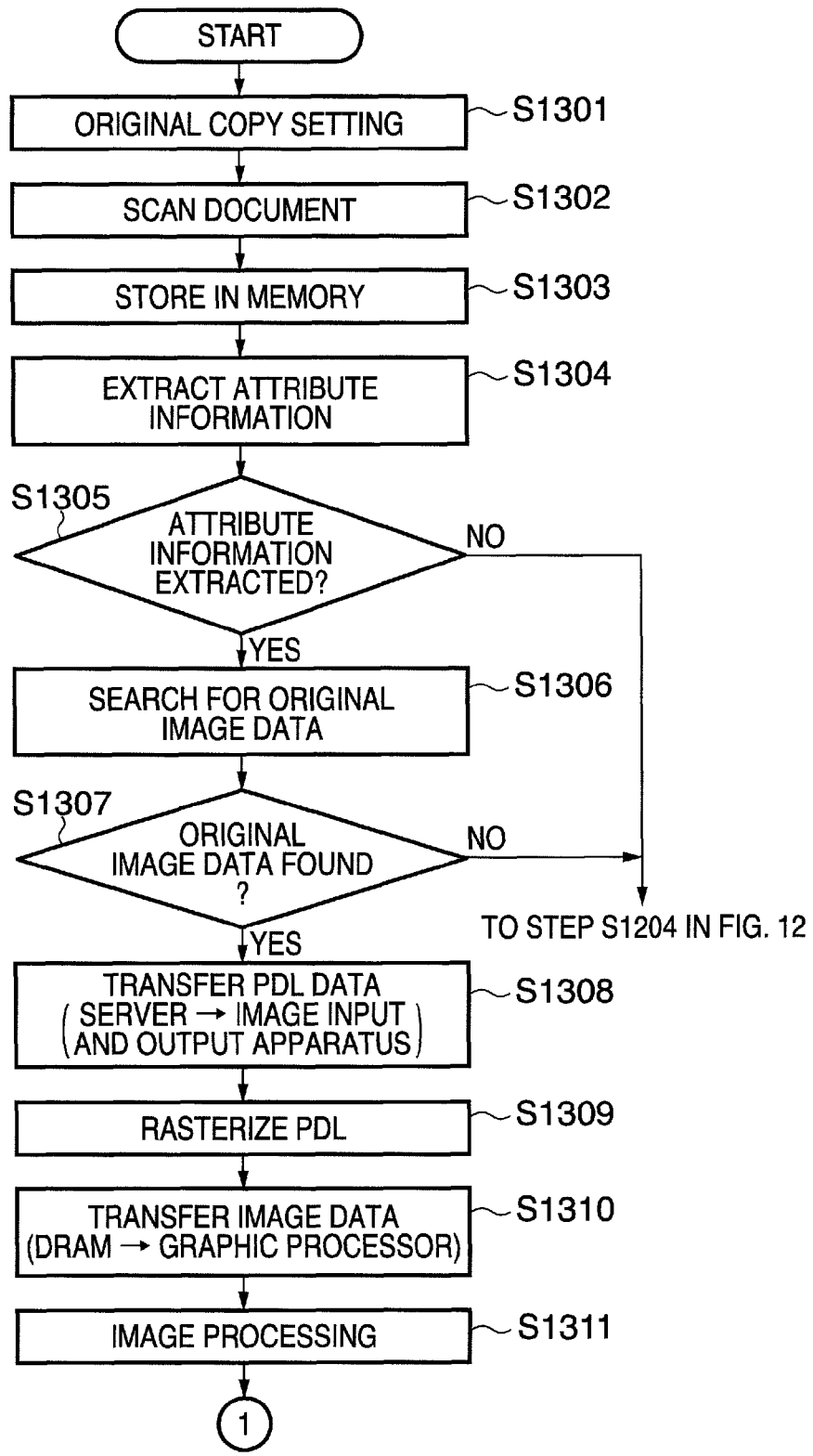
FIGS. 13A and 13B are flowcharts showing a sequence upon an original copy operation.
Figure 13B:
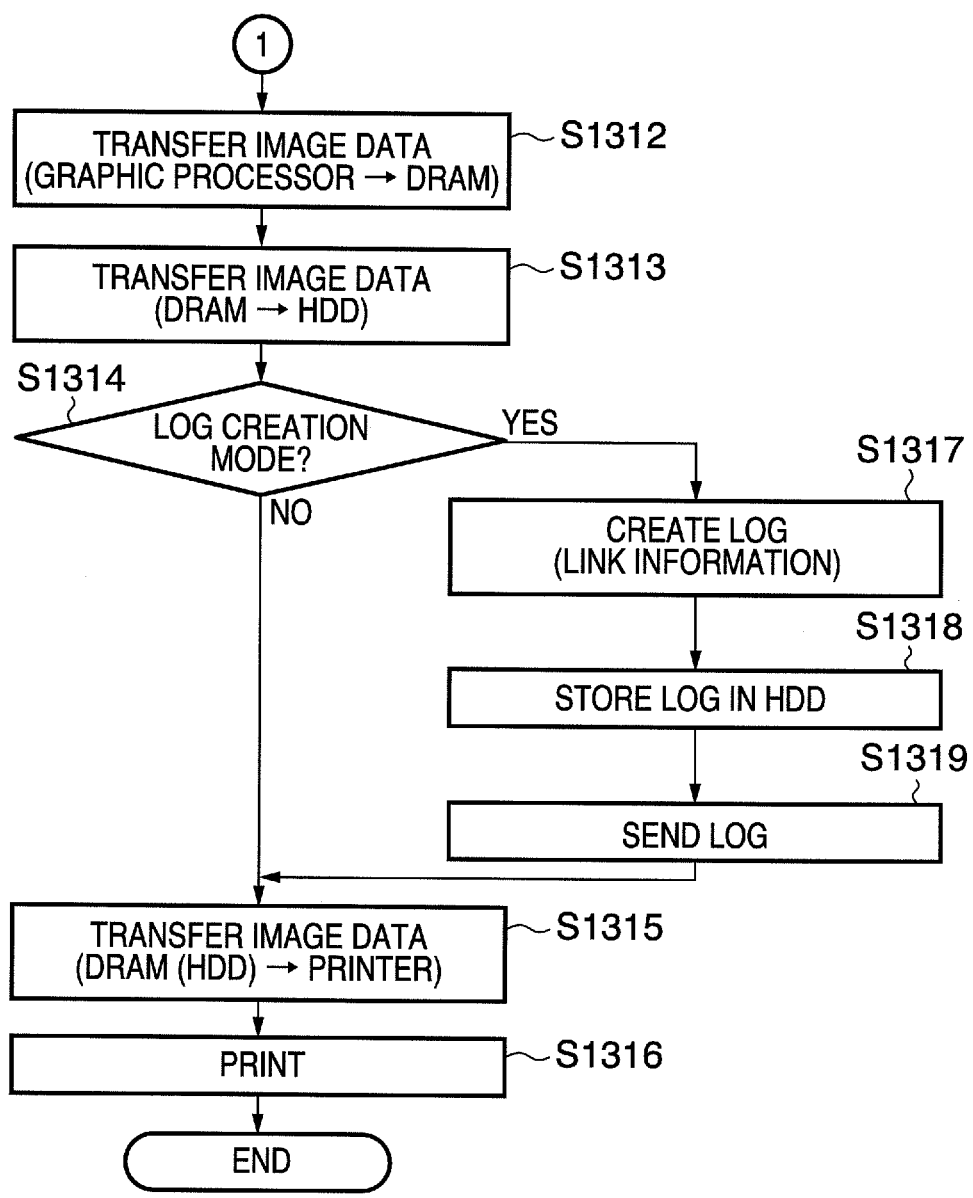

FIGS. 13A and 13B are flowcharts showing a sequence of the original copy operation.

Upon outputting an original copy image, the user makes copy settings of the copy image output job on the control panel 180 in step S1301. The copy setting content includes the number of copies, the paper size, single- or double-sided, enlargement or reduction in scale, switching sorted output and stapling on or off, and the like.

In step S1302, the main controller 111 of the controller unit 110 controls the reader unit 200 via the connector 160, based on an original copy start instruction issued on the control panel 180 to execute a scan operation of image data of documents. The document feeder unit 250 feeds placed documents one by one onto the platen glass 211, and simultaneously detects the document size. The document feeder unit 250 exposes and scans each document, based on the detected document size to scan image data. In step S1303, the scanned image data is compressed in an image format designated by the graphics processor 151, and is stored in the DRAM 122. Assume that the image data is scanned at a size equal to the size of the original, i.e., 100%, irrespective of the setting contents of the enlarge/reduce scale in the copy settings, and the graphics processor 151 executes the scaling processing in both the main scan and the sub-scan directions.

In step S1304, the image information analyzer 185 searches for attribute information appended prior to processing to the scanned image data, i.e., the image data obtained upon scanning, as a document, image data printed out in an attribute-appended print mode. The attribute information may be appended to a document image as the aforementioned two-dimensional barcode, or may be embedded in the document image as a digital watermark. The image information analyzer 185 extracts and analyzes information associated with the storage location such as the storage address and directory, the file name, and the like of original image data in the server 410.

A check is performed in step S1305 as to whether or not the attribute information can be normally extracted. If the attribute information cannot be normally extracted, the processes in step S1204 and subsequent steps in FIG. 12 are executed to perform the normal copy operation. If the attribute information can be normally extracted in step S1305, the server 410 is searched in step S1306 for the image data. A check is performed in step S1307 as to whether or not the image data is found in the server 410. If the image data is not found, the processes in step S1204 and subsequent steps in FIG. 12 are executed to perform the normal copy operation. If the image data is found in step S1307, the process advances to step S1308.

In step S1308, a driver software installed on the server 410 converts the found image data on the server 410 into the PDL data. The driver software transfers the PDL data to the controller unit 110 of the image input and output apparatus 100 via the network 400. If the original image data that is found in step S1307 has a printable format without being converted into the PDL data, the process may jump to step S1310, skipping the conversion to PDL data.

In step S1309, the CPU 112 of the main controller 111 of the controller unit 110 rasterizes the PDL data transferred via the connector 126 and network controller 125 into image data based on the print setting parameters. The image data is rasterized on the DRAM 122. Upon completion of rasterization of the image data, the process advances to step S1310.

In step S1310, the main controller 111 transfers the image data that is rasterized in the DRAM 122 to the graphics processor 151.

In step S1311, the graphics processor 151 executes the image processing based on the copy setting parameters. For example, when an enlarge scale=400% is set, the image scaling unit 702 as a module in the graphics processor 151 executes scaling processing in both the main scan and the sub-scan directions. Upon completion of the image processing of the image data, the process advances to step S1312.

In step S1312, the graphics processor 151 transfers the image data after the image processing to the main controller 111, which stores the transferred image data on the DRAM 122.

In step S1313, the main controller 111 converts the image data stored in the DRAM 122 into a file in a designated file format, and transfers and stores the image data file on the HD drive 132 via the HD controller 131.

A check is performed in step S1314 as to whether or not the image input and output apparatus 100 is set in the log creation mode. The administrator sets the log creation mode in the image input and output apparatus 100 prior to processing. If it is determined in step S1314 that the log creation mode is not set, the process advances to step S1315. If it is determined in step S1314 that the log creation mode is set, the log creation processing, including the image data itself, is executed as in step S1317 and subsequent steps.

In step S1317, the main controller 111 creates the log information, including the link information to the original image data that is stored in the server 410 as the image data. Note that the log information includes the user name whose print instruction was received, a date and time of reception of the original copy instruction, the number of copy pages, and the like, in addition to the link information of the original image data in the server 410. The log information may also include the copy setting content made in step S1301.

In step S1318, the main controller 111 records the log information in the HD drive 132. In step S1319, the image input and output apparatus 100 sends the log information to the server 410.

In step S1315, the main controller 111 transfers the image data to the printer unit 300. In such a circumstance, if no image data to be printed out exists in the DRAM 122, the main controller 111 loads an image file from the HD drive 132 and stores it in the DRAM 122. The main controller 111 transfers the image data in the DRAM 122 to the printer unit 300 at an appropriate timing, while controlling the printer unit 300 via the graphics processor 151, the printer image processor 153, and the connector 155.

In step S1316, the controller unit 110 controls the printer unit 300 to print out the image data. Upon completion of transfer of the image data, the original copy operation ends.

<9.3 Printout Sequence>

Figure 14:
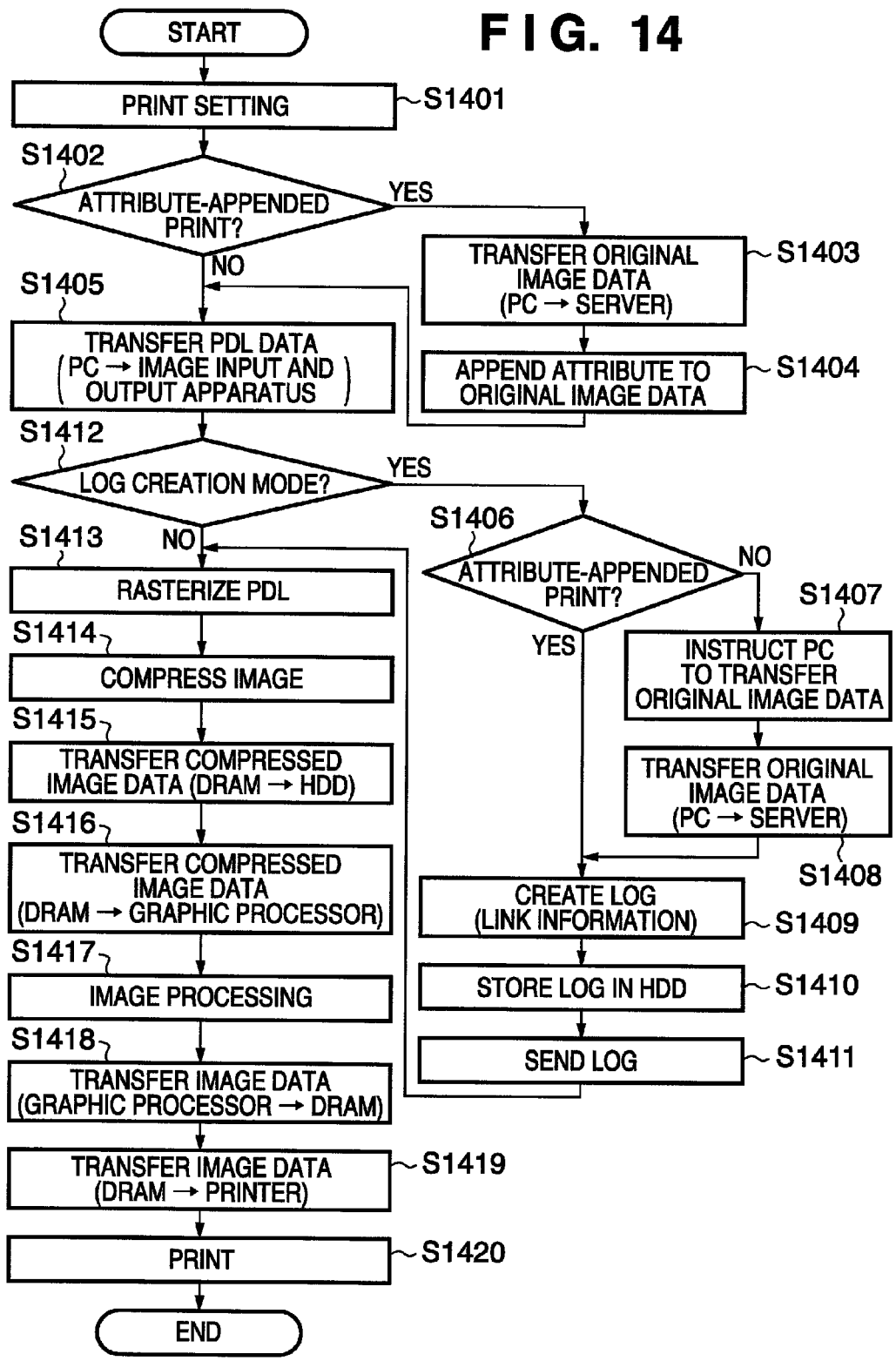
FIG. 14 is a flowchart showing a printout sequence in the image output system, according to a first embodiment of the present invention.

FIG. 14 is a flowchart showing a printout sequence in the image output system according to the first embodiment.

Upon execution of printout processing, the user makes print settings of the printout job using a printer driver on the PC 401 in step S1401. The print setting content includes the number of copies, the paper size, single- or double-sided, the page output order, switching the sorted output and stapling on or off, and the like. Upon making the print settings, the user also selects the attribute-appended print mode in this step. As per the foregoing, in the attribute-appended print mode, the image data is stored in the server 410, and the attribute information including information associated with the storage location such as the storage address, the folder, the file name, and the like of the image data is appended to the image data when the image data is printed. By reading out the attribute information, the original copy operation that prints out the image data stored in the server 410 can be attained.

A check is performed in step S1402 as to whether or not the attribute-appended print mode is selected. If the attribute-appended print mode is selected, the image data is transferred from the PC 401 to the server 410, and is stored on the server 410 in step S1403. Furthermore, in step S1404 the PC 401 appends the attribute information, including the information associated with the storage location such as the storage address of the network, the file name, and the like of the image data, to the image data to be sent to the image input and output apparatus 100.

Note that as an example of a method of appending attribute information to the image data, digital watermarking is available. The digital watermarking includes a patchwork method that embeds a digital watermark in a spatial domain, a method that embeds a digital watermark in the frequency domain by exploiting discrete cosine transformation, a method that embeds a digital watermark in the frequency domain by exploiting discrete Fourier transformation, and the like. As another example of a method of appending attribute information to image data, a two-dimensional barcode, such as the aforementioned QR code or the like, is available.

If it is determined in step S1402 that the attribute-appended print mode is not selected, steps S1403 and S1404 are skipped, and step S1405 and subsequent steps are executed.

Upon input of a printout instruction on the PC 401, driver software installed on the PC 401 converts image data to be printed out on the PC 401 into so-called PDL data in step S1405. The driver software transfers the PDL data to the controller unit 110 of the image input and output apparatus 100 via the network 400, together with the print setting parameters set in step S1401. If the attribute-appended print mode is selected in step S1402, the PDL data appended with the attribute information is transferred to the image input and output apparatus 100.

A check is performed in step S1412 as to whether or not the log creation mode is set. Assume that the administrator sets the log creation mode in the image input and output apparatus 100 prior to processing, using the control panel 180. If it is detected in step S1412 that the log creation mode is set, the process advances to step S1406. If it is not detected in step S1412 that the log creation mode is set, the process advances to step S1413.

A check is performed in step S1406 as to whether or not the attribute-appended print mode is selected. If the attribute-appended print mode is selected, the process advances to step S1409, since the original image data has already been transferred to the server 410 in step S1403. If the attribute-appended print mode is not selected, the process advances to step S1407, and the main controller ill instructs the PC 401 to transfer the original image data to the server 410. Assume that the administrator has already input the information about the server to which data is to be transferred prior to processing, in the image input and output apparatus 100 using the control panel 180.

Upon reception of the transfer instruction of the original image data to the server 410 in step S1407, the PC 401 transfers the image data in step S1408. Furthermore, the PC 401 sends attribute information including information associated with the storage location such as the storage address, the file name, and the like of the image data on the server 410 to the image input and output apparatus 100. Thus, the image input and output apparatus 100 can record the log information by the method according to the present invention by setting the log creation mode.

In step S1409, the main controller 111 creates the log information, including the link information to the original image data on the server 410. Note that the log information includes the job ID set by the image input and output apparatus 100, the user name whose printout instruction was received, a date and time of reception of the printout instruction, the number of print pages, and the like, in addition to the link information to the original image data on the server 410.

In step S1410, the main controller 111 records the log information on the HD drive 132. In step S1411, the image input and output apparatus 100 sends the log information to the server 410. According to the embodiment, the log information is sent to the server 410 at the timing of step S1411. However, since the log information is recorded on the HD drive 132, it may be sent at another send timing. Also, any of the servers 410, 411, and 412 may be identical.

In step S1413, the CPU 112 of the main controller 111 of the controller unit 110 rasterizes the PDL data transferred via the connector 126 and network controller 125 into image data based on the print setting parameters. The image data is rasterized on the DRAM 122. Upon completion of rasterization of the image data, the process advances to step S1414.

In step S1414, the main controller 111 applies image compression processing, such as JPEG compression or the like, to the image data that is rasterized on the DRAM 122 using the codec 133, and reconstructs the compressed image data in the DRAM 122.

In step S1415, the main controller 111 converts the compressed image data, which has undergone the image compression processing in step S1414, and is stored in the DRAM 122 into a file in a designated file format. The main controller 111 transfers the compressed image data file to the HD drive 132 via the HD controller 131, and stores it on the HD drive 132.

In step S1416, the main controller 111 transfers the compressed image data in the DRAM 122 to the graphics processor 151.

In step S1417, the graphics processor 151 decompresses the image data and applies the image processing independently of the print setting parameters. For example, a case will be exemplified below wherein, although the paper size designated in the print setting parameters is A4, the paper feed unit 360 of the printer unit 300 stores only A4R paper sheets. In such a circumstance, the graphics processor 151 rotates an image 90° to make outputs that fit the print sheets. Upon completion of the image processing of the image data, the process advances to step S1418.

In step S1418, the graphics processor 151 transfers the image data after the image processing to the main controller 111. The main controller 111 stores the transferred image data in the DRAM 122.

In step S1419, the main controller 111 transfers the image data to the printer unit 300. The main controller 111 transfers the image data in the DRAM 122 to the printer unit 300 at an appropriate timing, while controlling the printer unit 300 via the graphics processor 151, the printer image processor 153, and the connector 155.

In step S1420, the controller unit 110 controls the printer unit 300 to print out the image data. Upon completion of the transfer of the image data, the printout processing ends.

As can be apparent from the above description, in the image output system according to the embodiment, the image input and output apparatus 100 records information associated with the storage location of image data as the log information, and the image data itself is stored on the server 410. Furthermore, the image data to be stored on the server 410 is directly sent from the PC 401 upon printout processing.

In such a manner, the network load between the image input and output apparatus 100 and the server 410 can be reduced. Since the image data that is stored on the server 410 does not undergo any processing, such as compression or the like, a disadvantage such as a decline in analysis precision upon analyzing the log information can be avoided.

Furthermore, the image output system according to the embodiment exploits the conventional attribute-appended print mode so as to implement the preceding configuration.

That is, when the attribute-appended print mode is set, the image data is sent from the PC 401 to the server 410, and is stored on the server 410 in the printout processing. Furthermore, information associated with the storage location is appended to PDL data to be sent to the image input and output apparatus 100. Hence, when the attribute-appended print mode is set, the mode is exploited, and the information associated with the storage location appended to the image data is recorded as log information.

However, in such a circumstance, when the attribute-appended print mode is not set, the image data cannot be recorded as the log information. Hence, according to the embodiment, even when the attribute-appended print mode is not set, if the log creation mode is set, the main controller 111 instructs the PC 401 to send the image data to the server 410. Furthermore, the PC 401 sends the information associated with the storage location of the image data on the server 410 to the image input and output apparatus 100. Thus, even when the attribute-appended print mode is not set, the log information can be recorded by the method according to the present invention, thus enjoying the aforementioned effect.

Second Embodiment

In the first embodiment, when the attribute-appended print mode is not set, attribute information (information associated with the storage location of image data in the server) appended to PDL data is recorded as log information. However, the image input and output apparatus 100 and an apparatus such as a PC or the like which manages the log information cannot always access the storage location appended to the PDL data. If the image input and output apparatus 100 or PC cannot access the storage location, it cannot analyze the log information.

Hence, in this embodiment, in order to avoid the occurrence of such drawback, upon recording information associated with the storage location as log information, whether or not the image input and output apparatus 100 can access the storage location is determined before storage. Details of this embodiment will be described below.

Figure 15A:
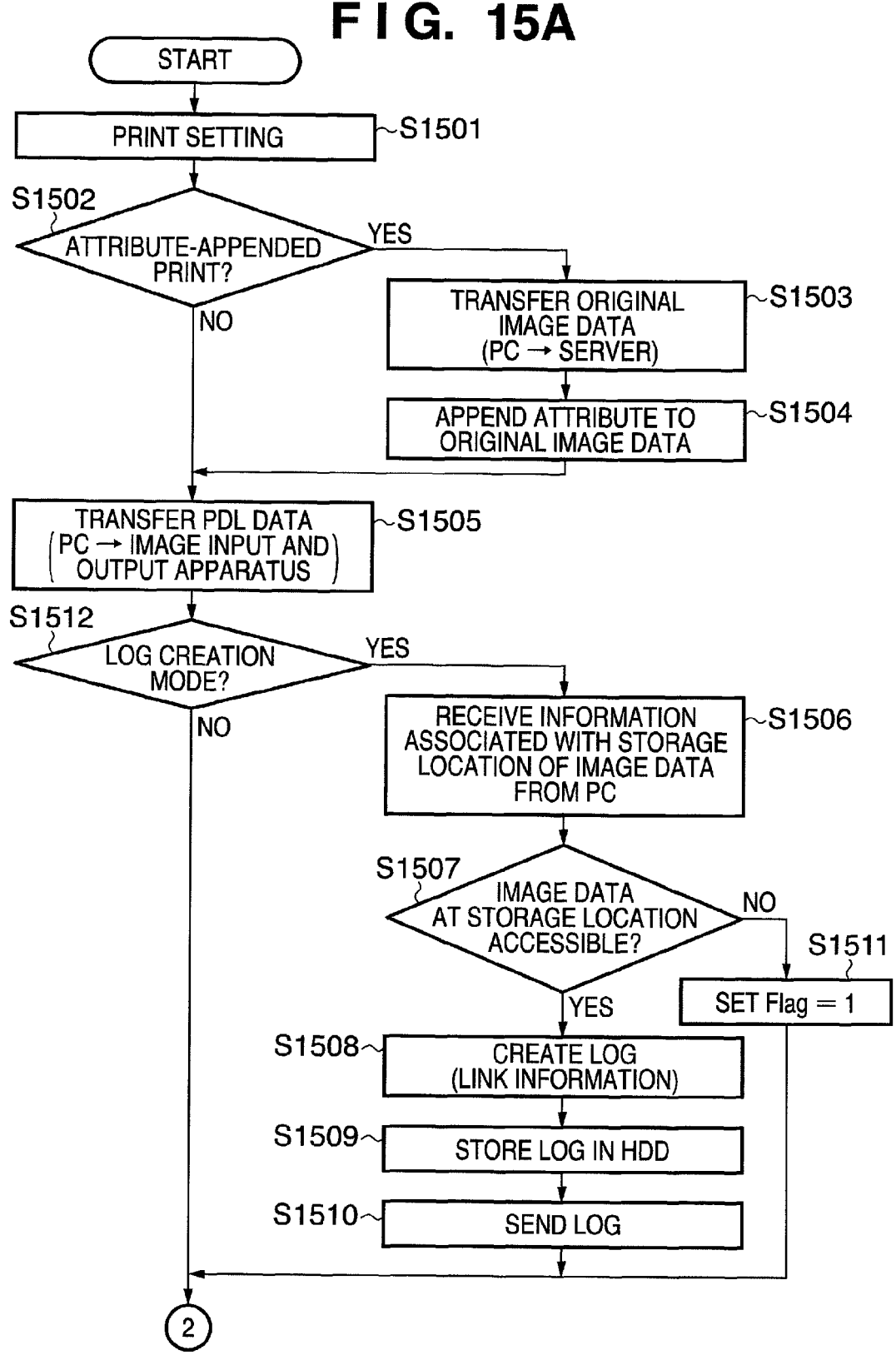
FIGS. 15A and 15B are flowcharts showing the printout sequence in the image output system, according to a second embodiment of the present invention.
Figure 15B:
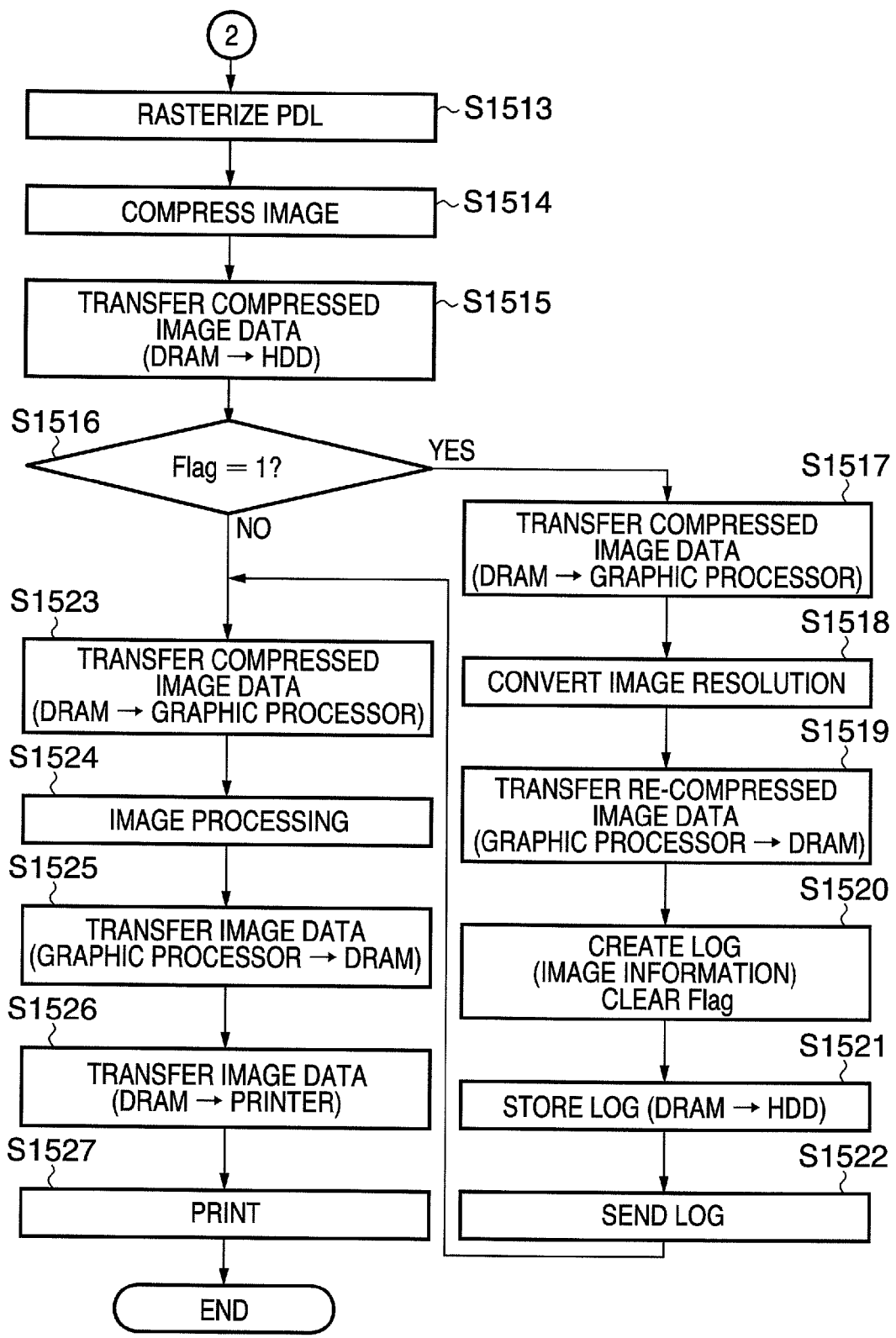

FIGS. 15A and 15B are flowcharts showing a printout sequence in the image output system according to the second embodiment.

Upon execution of printout processing, the user makes print settings of the printout job using a printer driver on the PC 401 in step S1501. The print setting content includes the number of copies, the paper size, single- or double-sided, the page output order, switching the sorted output and stapling on or off, and the like. Upon making the print settings, the user also selects the attribute-appended print mode in this step.

As per the foregoing, in the attribute-appended print mode, the image data is stored in the server 410, and the attribute information including information associated with the storage location such as the storage address, the folder, the file name, and the like of the image data is appended to the image data when the image data is printed. By reading out the attribute information, the original copy operation that prints out the image data stored in the server 410 can be attained.

A check is performed in step S1502 as to whether or not the attribute-appended print mode is selected. If the attribute-appended print mode is selected, the image data is transferred from the PC 401 to the server 410, and is stored on the server 410 in step S1503.

Furthermore, in step S1504 the PC 401 appends the attribute information, including the information associated with the storage location such as the storage address of the network, the file name, and the like of the image data, to the image data. Note that as an example of a method of appending attribute information to the image data, digital watermarking is available. The digital watermarking includes a patchwork method that embeds a digital watermark in a spatial domain, a method that embeds a digital watermark in the frequency domain by exploiting discrete cosine transformation, a method that embeds a digital watermark in the frequency domain by exploiting discrete Fourier transformation, and the like. As another example of a method of appending attribute information to image data, a two-dimensional barcode, such as the aforementioned QR code or the like is available.

If it is determined in step S1502 that the attribute-appended print mode is not selected, steps S1503 and S1504 are skipped, and step S1505 and subsequent steps are executed.

Upon input of a printout instruction on the PC 401, driver software installed on the PC 401 converts image data to be printed out on the PC 401 into so-called PDL data in step S1505. The driver software transfers the PDL data to the controller unit 110 of the image input and output apparatus 100 via the network 400, together with the print setting parameters set in step S1501. If the attribute-appended print mode is selected in step S1502, the PDL data appended with the attribute information is transferred to the image input and output apparatus 100.

A check is performed in step S1512 as to whether or not the log creation mode is set. Assume that the administrator sets the log creation mode in the image input and output apparatus 100 prior to processing, the control panel 180. If it is detected in step S1512 that the log creation mode is set, the process advances to step S1506. If it is not detected in step S1512 that the log creation mode is set, the process advances to step S1513.

In step S1506, the information associated with the storage location is received from the PC 401. A check is performed in step S1507 as to whether or not the image data designated in step S1506 is accessible.

If it is determined in step S1507 that the image data designated in step S1506 is accessible, the process advances to step S1508. If it is determined in step S1507 that the image data designated in step S1506 is not accessible, Flag=1 is set in step S1511, and the process advances to step S1513.

In step S1508, the main controller 111 creates log information including link information to the image data in the server 410. Note that the log information includes the job ID set by the image input and output apparatus 100, the user name whose print instruction was received, a date and time of reception of the print instruction, the number of print pages, and the like in addition to the link information to the original image data in the server 410.

In step S1509, the main controller 111 records the log information in the HD drive 132. In step S1510, the image input and output apparatus 100 sends the log information to the server 410. In this embodiment, the log information is sent to the server 410 at the timing of step S1510. However, since the log information is recorded in the HD drive 132, it may be sent at other send timings. Also, any of the servers 410, 411, and 412 may be identical ones.

In step S1513, the CPU 112 of the main controller 111 of the controller unit 110 rasterizes the PDL data transferred via the connector 126 and network controller 125 into the image data based on the print setting parameters. The image data is rasterized on the DRAM 122. Upon completion of rasterization of the image data, the process advances to step S1514.

In step S1514, the main controller 111 applies image compression processing such as JPEG compression or the like to the image data rasterized on the DRAM 122 using the codec 133, and reconstructs the compressed image data on the DRAM 122.

In step S1515, the main controller 111 converts the compressed image data which has undergone the image compression processing in step S1514 and is stored on the DRAM 122 into a file in a designated file format. The main controller 111 transfers the compressed image data file to the HD drive 132 via the HD controller 131 and stores it in the HD drive 132.

A check is performed in step S1516 if Flag=1 is set in step S1511. If Flag=1 is not set in step S1511, the process advances to step S1523. If Flag=1 is set in step S1511, the process advances to step S1517 to execute log processing including the image data itself.

Note that Flag=1 is set when the image input and output apparatus 100 cannot access the image data stored in the server. In this case, even when link information is recorded as log information, the image data cannot be analyzed upon analyzing the log information. In such case, the image input and output apparatus itself stores image data.

In step S1517, the main controller 111 transfers the compressed image data on the DRAM 122 to the graphic processor 151.

In step S1518, the graphic processor 151 decompresses the image data and converts the decompressed image data to a predetermined resolution to generate image data for a log. Or the graphic processor 151 re-compresses the decompressed image data at a predetermined compression ratio.

In step S1519, the graphic processor 151 transfers the re-compressed image data after the image processing to the main controller 111. The main controller 111 stores the transferred re-compressed image data on the DRAM 122.

In step S1520, the main controller 111 creates the log information including as image data the re-compressed image data stored on the DRAM 122 in step S1519. Note that the log information includes the job ID set by the image input and output apparatus 100, the user name whose print instruction was received, a date and time of reception of the print instruction, the number of print pages, and the like in addition to the re-compressed image data itself as the image data.

In step S1521, the main controller 111 records the log information in the HD drive 132. In step S1522, the image input and output apparatus 100 sends the log information to the server 410. In this embodiment, the log information is sent to the server 410 at the timing of step S1522. However, since the log information is recorded in the HD drive 132, it may be sent at other send timings. Also, any of the servers 410, 411, and 412 may be identical ones.

In step S1523, the main controller 111 transfers the compressed image data on the DRAM 122 to the graphic processor 151.

In step S1524, the graphic processor 151 decompresses the image data and applies image processing independently of the print setting parameters. For example, a case will be exemplified below wherein although the paper size designated in the print setting parameters is A4, the paper feed unit 360 of the printer unit 300 stores only A4R paper sheets. In this case, the graphic processor 151 rotates an image through 90° to make outputs that fit the print sheets. Upon completion of the image processing of the image data, the process advances to step S1525.

In step S1525, the graphic processor 151 transfers the image data after the image processing to the main controller 111. The main controller 111 stores the transferred image data on the DRAM 122.

In step S1526, the main controller 111 transfers the image data to the printer unit 300. The main controller 111 transfers the image data on the DRAM 122 to the printer unit 300 at an appropriate timing while controlling the printer unit 300 via the graphic processor 151, printer image processor 153, and connector 155.

In step S1527, the controller unit 110 controls the printer unit 300 to print out the image data. Upon completion of transfer of the image data, the printout processing ends.

As can be apparent from the above description, in the image output system according to this embodiment confirms whether or not the image input and output apparatus can access the storage location before storage upon recording information associated with the storage location appended to PDL data, as log information.

In this way, a situation wherein the image input and output apparatus cannot access image data in the server 410 and cannot analyze log information upon analyzing the log information can be avoided.

Third Embodiment

In the second embodiment, upon recording information associated with the storage location of image data as log information, whether or not the image input and output apparatus can access the storage location is confirmed before storage. However, even when the image input and output apparatus can access the storage location, if that image data is a file type that the image input and output apparatus or an apparatus such as a PC or the like which manages log information cannot load, the image input and output apparatus cannot analyze the log information.

In general, the types of applications installed in the image input and output apparatus are limited compared to the PC 401 and the like. Since image data to be sent from the PC 401 to the image input and output apparatus upon printout processing is converted into PDL data, the image input and output apparatus can execute print processing independently of an application used to generate the image data.

By contrast, the image data which is sent from the PC 401 and is stored in the server 410 is a file appended with an extension corresponding to the type of application used to create the image data. Therefore, when the image input and output apparatus reads out image data from the server 410 upon analyzing the log information, the image input and output apparatus or PC need be installed with the application corresponding to the extension of that file. However, as described above, the types of applications installed in the image input and output apparatus or PC are limited. For this reason, when image data which is generated using an application that is not installed in the image input and output apparatus or PC is stored in the server 410, the image input and output apparatus or PC cannot load the image data upon analyzing the log information.

In this embodiment, in order to avoid occurrence of such situation, upon recording information associated with the storage location as log information, whether or not source image data of the PDL data is generated using an application supported by the image input and output apparatus is checked. In this way, a situation wherein image data stored in the server 410 cannot be loaded and log information cannot be analyzed upon analyzing the log information can be avoided. Details of this embodiment will be described below.

Figure 16A:
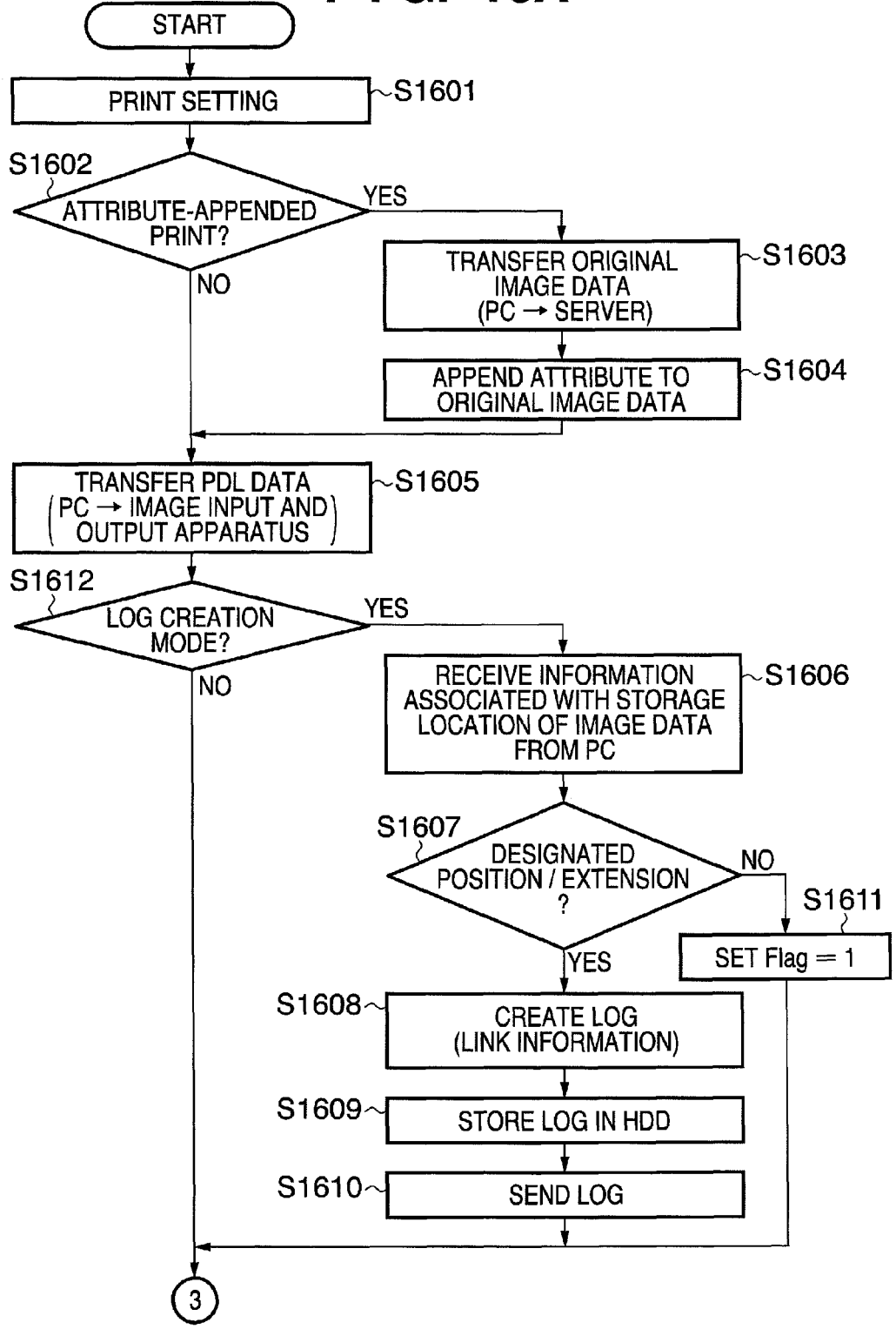
FIGS. 16A and 16B are flowcharts showing a printout sequence in the image output system, according to a third embodiment of the present invention.
Figure 16B:
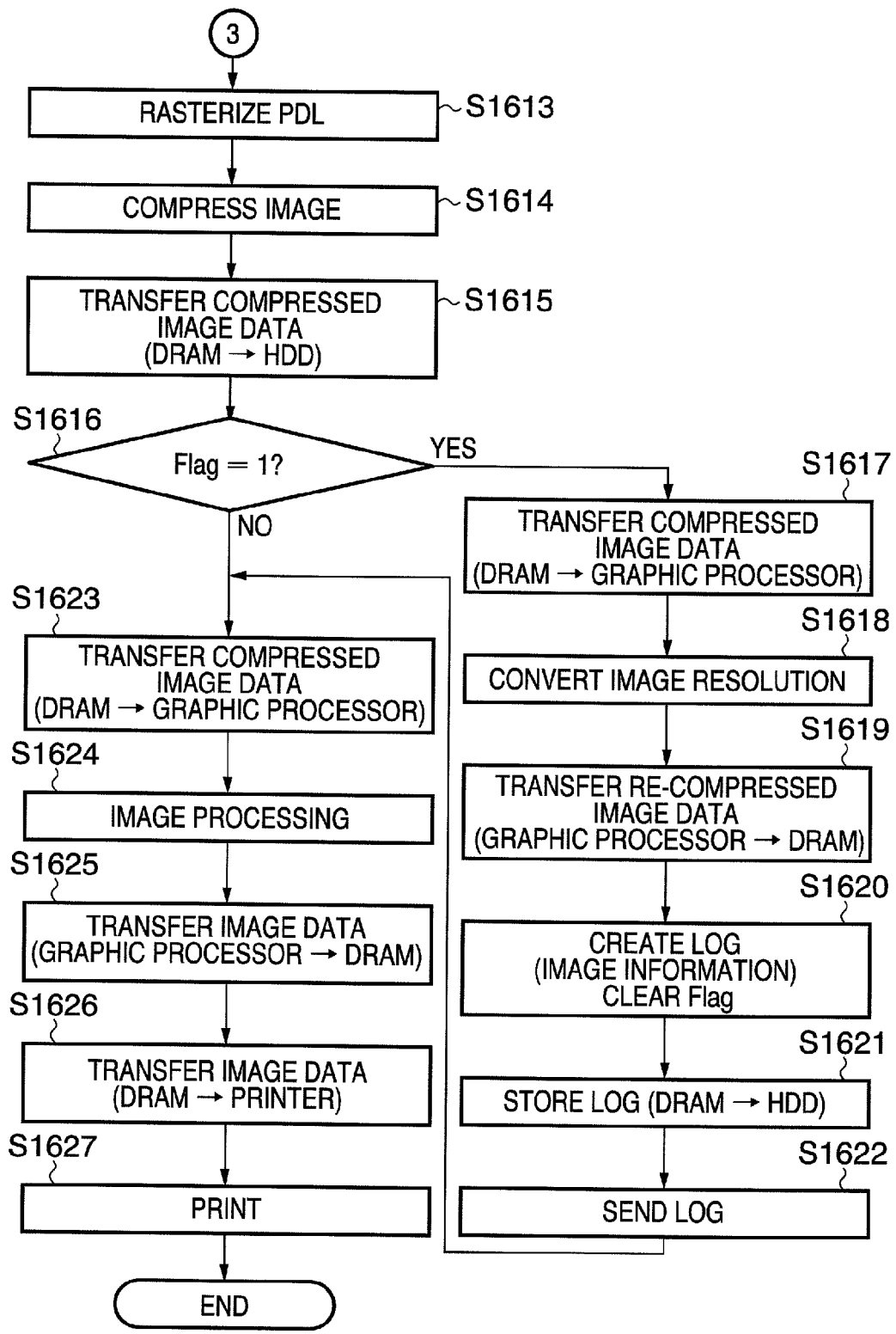

FIGS. 16A and 16B are flowcharts showing the printout sequence in the image output system according to the third embodiment.

Upon execution of printout processing, the user makes print settings of the printout job using a printer driver on the PC 401 in step S1601. The print setting content include the number of copies, the paper size, single- or double-sided, the page output order, switching the sorted output and stapling on or off, and the like. Upon making the print settings, the user also selects the attribute-appended print mode in this step.

As per the foregoing, in the attribute-appended print mode, the image data is stored in the server 410, and the attribute information including information associated with the storage location such as the storage address, the folder, the file name, and the like of the image data is appended to the image data when the image data is printed. By reading out the attribute information, the original copy operation that prints out the image data stored in the server 410 can be attained.

A checked is performed in step S1602 as to whether or not the attribute-appended print mode is selected. If the attribute-appended print mode is selected, the image data is transferred from the PC 401 to the server 410, and is stored on the server 410 in step S1603. Furthermore, in step S1604 the PC 401 appends the attribute information, including the information associated with the storage location such as the storage address of the network, the file name, and the like of the image data, to the image data.

Note that as an example of a method of appending attribute information to the image data, digital watermarking is available. The digital watermarking includes a patchwork method that embeds a digital watermark in a spatial domain, a method that embeds a digital watermark in the frequency domain by exploiting discrete cosine transformation, a method that embeds a digital watermark in the frequency domain by exploiting discrete Fourier transformation, and the like. As another example of a method of appending attribute information to image data, a two-dimensional barcode such as the aforementioned QR code or the like is available.

If it is determined in step S1602 that the attribute-appended print mode is not selected, steps S1603 and S1604 are skipped, and step S1605 and subsequent steps are executed.

Upon input of a printout instruction on the PC 401, driver software installed on the PC 401 converts image data to be printed out on the PC 401 into so-called PDL data in step S1605. The driver software transfers the PDL data to the controller unit 110 of the image input and output apparatus 100 via the network 400, together with the print setting parameters set in step S1601. If the attribute-appended print mode is selected in step S1602, the PDL data appended with the attribute information is transferred to the image input and output apparatus 100.

A check is performed in step S1612 as to whether or not the log creation mode is set. Assume that the administrator sets the log creation mode in the image input and output apparatus 100 prior to processing using the control panel 180. If it is detected in step S1612 that the log creation mode is set, the process advances to step S1606. If it is not detected in step S1612 that the log creation mode is set, the process advances to step S1613.

In step S1606, the information associated with the storage location is received from the PC 401. It is checked in step S1607 if the image data can be loaded. Whether or not the image data can be loaded is determined based on an extension of that image data. Also, the type of a file generated by a specific OS (operating system) is identifiable using attribute information other than the extension. In case of such file, the type of the file is identified using that attribute information to check whether or not the image data can be loaded.

If it is determined in step S1607 that the image data designated in step S1606 can be loaded, the process advances to step S1608. If it is determined in step S1607 that the image data designated in step S1606 cannot be loaded, Flag=1 is set in step S1611, and the process advances to step S1613.

In step S1608, the main controller 111 creates log information including link information to the image data in the server 410. Note that the log information includes the job ID set by the image input and output apparatus 100, the user name whose print instruction was received, a date and time of reception of the print instruction, the number of print pages, and the like in addition to the link information to the original image data in the server 410.

In step S1609, the main controller 111 records the log information in the HD drive 132. In step S1610, the image input and output apparatus 100 sends the log information to the server 410. In this embodiment, the log information is sent to the server 410 at the timing of step S1610. However, since the log information is recorded in the HD drive 132, it may be sent at other send timings. Also, any of the servers 410, 411, and 412 may be identical ones.

In step S1613, the CPU 112 of the main controller 111 of the controller unit 110 rasterizes the PDL data transferred via the connector 126 and network controller 125 into image data based on the print setting parameters. The image data is rasterized on the DRAM 122. Upon completion of rasterization of the image data, the process advances to step S1614.

In step S1614, the main controller 111 applies image compression processing such as JPEG compression or the like to the image data rasterized on the DRAM 122 using the codec 133, and reconstructs the compressed image data on the DRAM 122.

In step S1615, the main controller 111 converts the compressed image data which has undergone the image compression processing in step S1614 and is stored on the DRAM 122 into a file in a designated file format. The main controller 111 transfers the compressed image data file to the HD drive 132 via the HD controller 131 and stores it in the HD drive 132.

It is checked in step S1616 if Flag=1 is set in step S1611. If Flag=1 is not set in step S1611, the process advances to step S1623. If Flag=1 is set in step S1611, the process advances to step S1617 to execute log processing including image data itself. Note that Flag=1 is set when the image input and output apparatus 100 cannot load image data stored in the server. In this case, even when the link information is recorded as the log information, the image data cannot be analyzed upon analyzing the log information. In such case, the image input and output apparatus itself stores the image data.

In step S1617, the main controller 111 transfers the compressed image data on the DRAM 122 to the graphic processor 151.

In step S1618, the graphic processor 151 decompresses the image data and converts the decompressed image data to a predetermined resolution to generate image data for a log. Or the graphic processor 151 re-compresses the decompressed image data at a predetermined compression ratio.

In step S1619, the graphic processor 151 transfers the re-compressed image data after the image processing to the main controller 111. The main controller 111 stores the transferred re-compressed image data on the DRAM 122.

In step S1620, the main controller 111 creates log information including as image data the re-compressed image data stored on the DRAM 122 in step S1619. Note that the log information includes the job ID set by the image input and output apparatus 100, the user name whose print instruction was received, a date and time of reception of the print instruction, the number of print pages, and the like in addition to the re-compressed image data itself as image data.

In step S1621, the main controller 111 records the log information in the HD drive 132. In step S1622, the image input and output apparatus 100 sends the log information to the server 410. In this embodiment, the log information is sent to the server 410 at the timing of step S1622. However, since the log information is recorded in the HD drive 132, it may be sent at other send timings. Also, any of the servers 410, 411, and 412 may be identical ones.

In step S1623, the main controller 111 transfers the compressed image data on the DRAM 122 to the graphic processor 151.

In step S1624, the graphic processor 151 decompresses the image data and applies image processing independently of the print setting parameters. For example, a case will be exemplified below wherein although the paper size designated in the print setting parameters is A4, the paper feed unit 360 of the printer unit 300 stores only A4R paper sheets. In this case, the graphic processor 151 rotates an image through 90° to make outputs that fit the print sheets. Upon completion of the image processing of the image data, the process advances to step S1625.

In step S1625, the graphic processor 151 transfers the image data after the image processing to the main controller 111. The main controller 111 stores the transferred image data on the DRAM 122.

In step S1626, the main controller 111 transfers the image data to the printer unit 300. The main controller 111 transfers the image data on the DRAM 122 to the printer unit 300 at an appropriate timing while controlling the printer unit 300 via the graphic processor 151, printer image processor 153, and connector 155.

In step S1627, the controller unit 110 controls the printer unit 300 to print out the image data. Upon completion of transfer of the image data, the printout processing ends.

As can be seen from the above description, the image output system according to this embodiment checks whether or not the image input and output apparatus can load image data at the storage destination upon recording information associated with the storage location appended to image data, as log information.

In this way, a situation wherein the image data stored in the server 410 cannot be loaded and log information cannot be analyzed upon analyzing the log information can be avoided.

Other Embodiments

Note that the present invention may be applied to either a system constituted by a plurality of devices (e.g., a host computer, interface device, reader, printer, and the like), or an apparatus consisting of a single equipment (e.g., a copying machine, facsimile apparatus, or the like).

The objects of the present invention are also achieved by supplying a storage medium, which records a program code of a software program that can implement the functions of the above-mentioned embodiments to the system or apparatus. In this case, the functions are implemented when a computer (or a CPU or MPU) of the system or apparatus reads out and executes the program code stored in the storage medium. Note that, in this case, the storage medium which stores the program code constitutes the present invention.

As the storage medium for supplying the program code, for example, a Floppy® disk, hard disk, optical disk, magneto-optical disk, CD-ROM, CD-R, magnetic tape, nonvolatile memory card, ROM, and the like may be used.

The present invention is not limited to a case wherein the functions of the above-mentioned embodiments are implemented when the computer executes the readout program code. For example, the present invention also includes a case wherein an OS (operating system) running on the computer executes some or all of actual processing operations on the basis of an instruction of the program code to implement the functions of the above-mentioned embodiments.

Furthermore, the present invention also includes a case wherein the functions of the above-mentioned embodiments are implemented after the program code read out from the storage medium is written in a memory of a function expansion board or a function expansion unit, which is inserted in or connected to the computer. That is, the present invention also includes a case wherein after the program code is written in the memory, a CPU or the like of the function expansion board or function expansion unit executes some or all of actual processing operations to implement the functions of the aforementioned embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-162809 filed on Jun. 12, 2006, which is hereby incorporated by reference herein in its entirety.

What is claimed is:

1. A printing system comprising:
a printing apparatus;
an information processing apparatus; and
a server,
wherein the printing apparatus, the information processing apparatus, and the server are respectively independent apparatuses connected via a network,
wherein the information processing apparatus comprises:
a first transmitting unit configured to transmit image data to the server;
a second transmitting unit configured to transmit the image data to the printing apparatus; and
a third transmitting unit configured to transmit, to the printing apparatus, location information indicating a storage location of the image data transmitted to the server by the first transmitting unit,
wherein the server comprises:
a storage unit configured to store the image data transmitted to the server by the first transmitting unit, and
wherein the printing apparatus comprises:
a printing unit configured to perform printing processing based on the image data transmitted to the printing apparatus by the second transmitting unit;
a determining unit configured to determine whether or not the printing apparatus can access the image data stored in the storage unit of the server based on the location information transmitted to the printing apparatus by the third transmitting unit; and
a generating unit configured to generate, when the determining unit determines that the printing apparatus can access the image data stored in the storage unit of the server, log information regarding the printing processing by using the location information, and when the determining unit determines that the printing apparatus cannot access the image data stored in the storage unit of the server, the log information by using the image data transmitted to the printing apparatus by the second transmitting unit.

2. The printing system according to claim 1, wherein the printing apparatus further comprises a converting unit configured to convert an image resolution of the image data, and
wherein, when the determining unit determines that the printing apparatus cannot access the image data stored in the storage unit of the server, the generating unit is configured to generate the log information by using the image data of which the image resolution is converted by the converting unit.

3. The printing system according to claim 1, wherein the printing apparatus further comprises a storing unit configured to store the log information generated by the generating unit.

4. The printing system according to claim 1, wherein the printing apparatus further comprises a sending unit configured to send the log information generated by the generating unit to an external apparatus.

5. A printing method implemented by a printing apparatus comprised in a printing system, wherein the printing system further comprises an information processing apparatus comprising (a) a first transmitting unit configured to transmit image data to a server that comprises a storage unit configured to store the image data transmitted by the first transmitting unit, (b) a second transmitting unit configured to transmit the image data to the printing apparatus, and (c) a third transmitting unit configured to transmit, to the printing apparatus, location information indicating a storage location of the image data transmitted to the server by the first transmitting unit, and wherein the printing apparatus, the information processing apparatus, and the server are respectively independent apparatuses connected via a network, the method comprising:
a printing step of performing printing processing based on the image data transmitted to the printing apparatus by the second transmitting unit;
a determining step of determining whether or not the printing apparatus can access the image data stored in the storage unit of the server based on the location information transmitted to the printing apparatus by the third transmitting unit; and
a generating step of generating, when it is determined in the determining step that the printing apparatus can access the image data stored in the storage unit of the server, log information regarding the printing processing by using the location information, and when it is determined in the determining step that the printing apparatus cannot access the image data stored in the storage unit of the server, the log information by using the image data transmitted to the printing apparatus by the second transmitting unit.

6. A non-transitory computer readable medium encoded with a computer-readable control program configured to be executed at least by a computer of a printing apparatus comprised in a printing system, wherein the printing system further comprises an information processing apparatus which comprises (a) a first transmitting unit configured to transmit image data to a server that comprises a storage unit configured to store the image data transmitted by the first transmitting unit, (b) a second transmitting unit configured to transmit the image data to the printing apparatus, and (c) a third transmitting unit configured to transmit, to the printing apparatus, location information indicating a storage location of the image data transmitted to the server by the first transmitting unit, and wherein the printing apparatus, the information processing apparatus, and the server are respectively independent apparatuses connected via a network, the program comprising:
printing instructions configured to perform printing processing based on the image data transmitted to the printing apparatus by the second transmitting unit;
determining instructions configured to determine whether or not the printing apparatus can access the image data stored in the storage unit of the server based on the location information transmitted to the printing apparatus by the third transmitting unit; and generating instructions configured to generate, when it is determined according to the determining instructions that the printing apparatus can access the image data stored in the storage unit of the server, log information regarding the printing processing by using the location information, and when it is determined according to the determining instructions that the printing apparatus cannot access the image data stored in the storage unit of the server, the log information by using the image data transmitted to the printing apparatus by the second transmitting unit.

7. A printing apparatus comprising:

a CPU; and at least one memory device connected to the CPU and in which is written program code executable at least by the CPU, wherein at least the CPU is configured by the program code at least to:

perform printing processing based on image data transmitted to the printing apparatus by an information processing apparatus;

determine whether or not the printing apparatus can access the image data at a storage location in a storage unit of a server based on location information transmitted to the printing apparatus by the information processing apparatus; and generate, when it is determined that the printing apparatus can access the image data at the storage location in the storage unit of the server, log information regarding the printing processing by using the location information, and when it is determined that the printing apparatus cannot access the image data at the storage location in the storage unit of the server, the log information by using the image data transmitted to the printing apparatus by the information processing apparatus, wherein the information processing apparatus and the server are respectively independent apparatuses from the printing apparatus and each other, and are respectively connected to the printing apparatus via a network.

* * * * *